US011782531B2

(12) United States Patent
Ely

(10) Patent No.: US 11,782,531 B2
(45) Date of Patent: Oct. 10, 2023

(54) GESTURE DETECTION, LIST NAVIGATION, AND ITEM SELECTION USING A CROWN AND SENSORS

(71) Applicant: Apple Inc., Cupertino, CA (US)

(72) Inventor: Colin M. Ely, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 769 days.

(21) Appl. No.: 15/409,418

(22) Filed: Jan. 18, 2017

(65) Prior Publication Data

US 2018/0081453 A1 Mar. 22, 2018

Related U.S. Application Data

(60) Provisional application No. 62/396,732, filed on Sep. 19, 2016.

(51) Int. Cl.
*G06F 3/0362* (2013.01)
*G06F 3/04886* (2022.01)
(Continued)

(52) U.S. Cl.
CPC ............ *G06F 3/0362* (2013.01); *G06F 1/163* (2013.01); *G06F 3/0482* (2013.01); *G06F 3/0485* (2013.01); *G06F 3/04886* (2013.01); *G06F 3/165* (2013.01); *G06F 3/04883* (2013.01); *G06F 2200/1636* (2013.01); *G06F 2203/0339* (2013.01)

(58) Field of Classification Search
CPC ............... G06F 1/163; G06F 3/00–167; G06F 2203/04808; G06F 3/048–04897; G06F 2200/1636; G06F 1/165; G06F 3/0354; G06F 3/0362; G06F 3/165; G06F 2203/0339; G04G 17/00–086; G04G 21/00–08; G04G 99/00–006
USPC ..................... 178/18.01–20.4; 345/173–178; 715/810–845, 821–823
See application file for complete search history.

(56) References Cited

U.S. PATENT DOCUMENTS 10,139,915 B1 * 11/2018 Miller ..................... G06F 1/163
2006/0139320 A1 6/2006 Lang
(Continued)

FOREIGN PATENT DOCUMENTS

CN 1867140 A 11/2006
CN 103002148 A 3/2013
(Continued)

OTHER PUBLICATIONS

Invitation to Pay Additional Fees received for PCT Patent Application No. PCT/US2017/049791, dated Oct. 10, 2017, 2 pages.
(Continued)

*Primary Examiner* — Amr A Awad
*Assistant Examiner* — Aaron Midkiff
(74) *Attorney, Agent, or Firm* — DLA Piper LLP (US)

(57) ABSTRACT

The present disclosure generally relates to methods and apparatuses for detecting gestures on a reduced-size electronic device at locations off of the display, such as gestures on the housing of the device or on a rotatable input mechanism (e.g., a digital crown) of the device, and responding to the gestures by, for example, navigating lists of items and selecting items from the list; translating the display of an electronic document; or sending audio control data to an external audio device.

21 Claims, 31 Drawing Sheets

(51) Int. Cl.
*G06F 1/16* (2006.01)
*G06F 3/0482* (2013.01)
*G06F 3/0485* (2022.01)
*G06F 3/16* (2006.01)
*G06F 3/04883* (2022.01)

(56) References Cited

U.S. PATENT DOCUMENTS

| | | | |
|---|---|---|---|
| 2007/0094417 A1 | 4/2007 | Hur et al. | |
| 2011/0059769 A1* | 3/2011 | Brunolli | G08C 17/02 455/556.1 |
| 2011/0240455 A1 | 10/2011 | Kulczycki et al. | |
| 2012/0242626 A1 | 9/2012 | Hu | |
| 2013/0063361 A1* | 3/2013 | Pasquero | G06F 3/0237 345/173 |
| 2014/0328147 A1 | 11/2014 | Yang et al. | |
| 2015/0015513 A1 | 1/2015 | Kwak et al. | |
| 2015/0041289 A1 | 2/2015 | Ely | |
| 2015/0121274 A1 | 4/2015 | Kishimoto et al. | |
| 2015/0160856 A1* | 6/2015 | Jang | G06F 3/04842 715/773 |
| 2016/0034167 A1 | 2/2016 | Wilson et al. | |
| 2016/0098016 A1 | 4/2016 | Ely et al. | |
| 2016/0239142 A1* | 8/2016 | Kim | G06F 3/0416 |
| 2016/0259301 A1 | 9/2016 | Ely | |
| 2016/0259497 A1 | 9/2016 | Foss et al. | |
| 2016/0259530 A1 | 9/2016 | Everitt et al. | |
| 2018/0341344 A1 | 11/2018 | Foss et al. | |

FOREIGN PATENT DOCUMENTS

| | | |
|---|---|---|
| CN | 104142621 A | 11/2014 |
| CN | 104350452 A | 2/2015 |
| CN | 104575554 A | 4/2015 |
| CN | 105068412 A | 11/2015 |
| CN | 105528113 A | 4/2016 |
| CN | 105677029 A | 6/2016 |
| CN | 105808142 A | 7/2016 |
| CN | 105892569 A | 8/2016 |
| JP | 2013-123934 A | 6/2013 |
| TW | 201239556 A | 10/2012 |
| TW | 201610758 A | 3/2016 |
| WO | 2015/122885 A1 | 8/2015 |

OTHER PUBLICATIONS

International Search Report and Written Opinion received for PCT Patent Application No. PCT/US2017/049791, dated Jan. 5, 2018, 30 Pages.
International Preliminary Report on Patentability received for PCT Patent Application No. PCT/US2017/049791, dated Mar. 28, 2019, 26 pages.
Extended European Search Report received for European Patent Application No. 17851316.4, dated Dec. 3, 2019, 7 pages.
Notice of Allowance received for Chinese Patent Application No. 201780057626.8, dated Jan. 10, 2023, 2 pages (1 page of English Translation and 1 page of Official Copy).
Office Action received for Chinese Patent Application No. 201780057626.8, dated Jun. 6, 2022, 37 pages (21 pages of English Translation and 16 pages of Official Copy).
Office Action received for Chinese Patent Application No. 201910315341.0, dated Mar. 29, 2022, 21 pages (11 pages of English Translation and 10 pages of Official Copy).
Office Action received for Chinese Patent Application No. 201910315341.0, dated Nov. 8, 2022, 16 pages (09 pages of English Translation and 07 pages of Official Copy).
Office Action received for European Patent Application No. 17851316.4, dated Jun. 28, 2021, 8 pages.
Summons to Attend Oral Proceedings received for European Patent Application No. 17851316.4, dated Oct. 11, 2022, 14 pages.

* cited by examiner

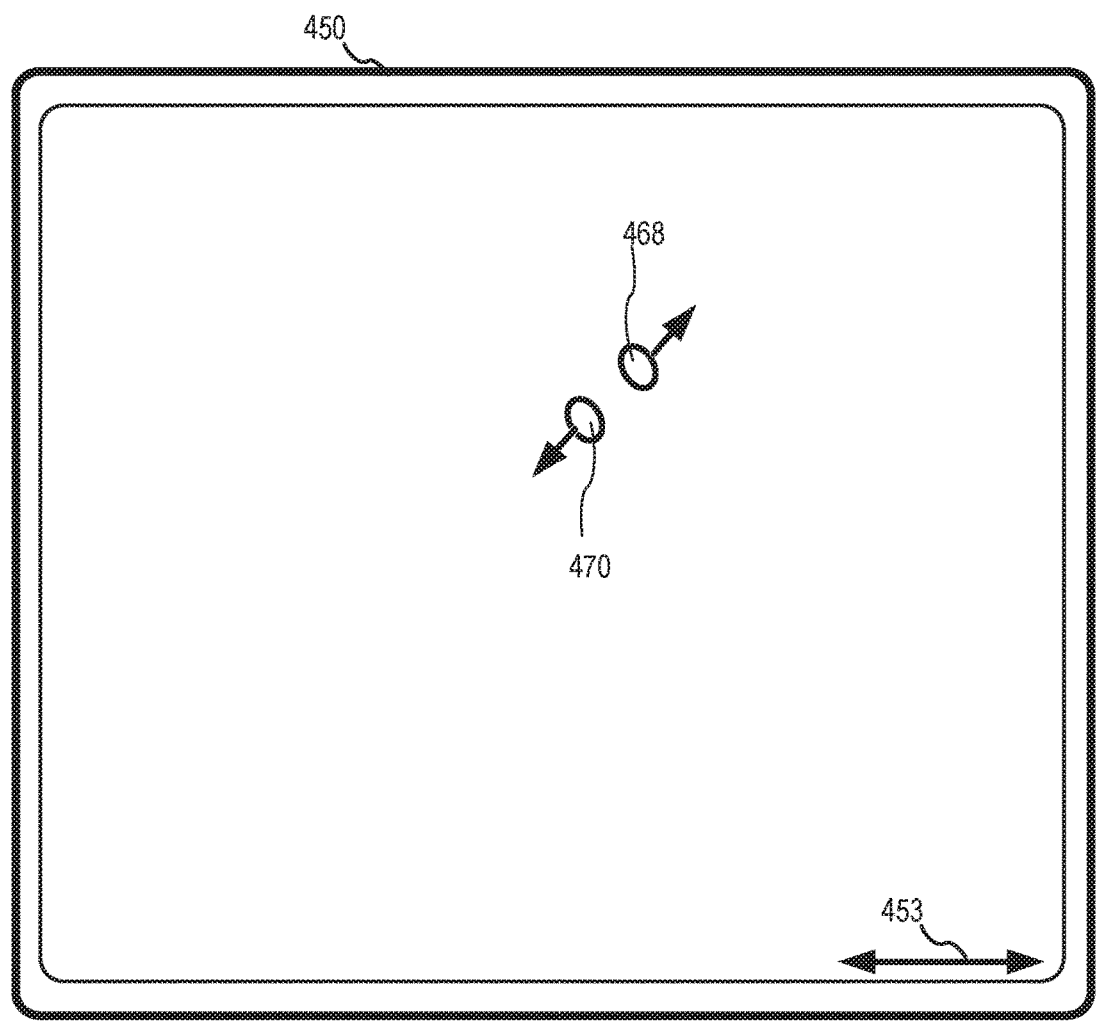
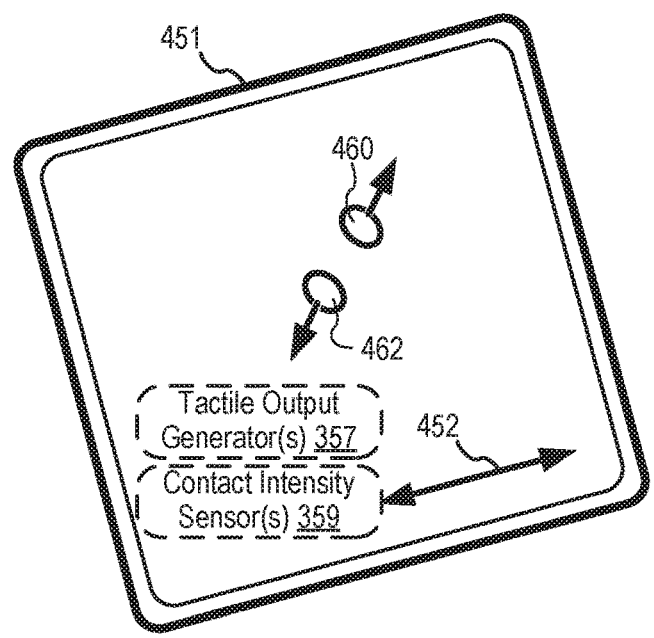
FIG. 4B

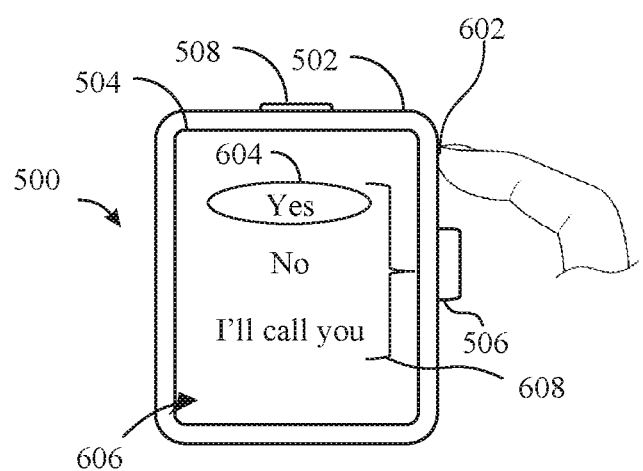 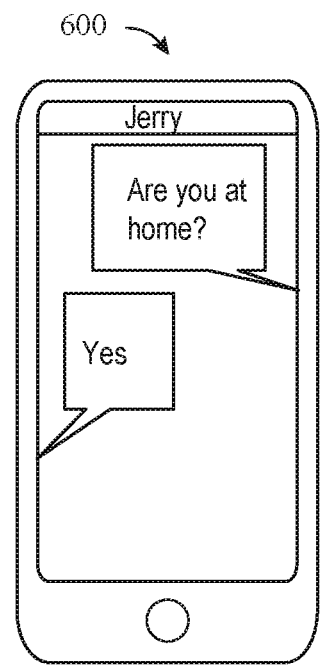
*FIG. 6A*      *FIG. 6B*

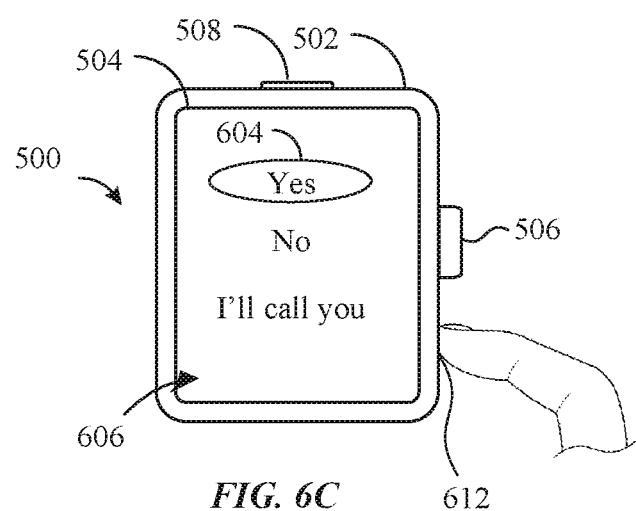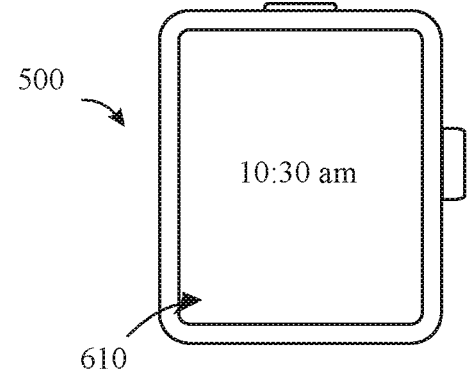
*FIG. 6C*    *FIG. 6D*

1000

1002
Display a portion of an electronic document.

1004
While displaying the first user interface screen, detect a swipe gesture starting at a location corresponding to the rotatable input mechanism.

> Optionally, the swipe gesture comprises a horizontal movement of a contact on the rotatable input mechanism.

> Optionally, the swipe gesture comprises a vertical movement of a contact on the housing.

> Optionally, the swipe gesture comprises a movement of a contact on the housing along an axis that is substantially perpendicular to the display.

1006
Determine the direction of the swipe gesture relative to the rotatable input mechanism.

1008
Translate the display of the electronic document in accordance with the determined direction of the swipe gesture.

1102
While the display is inactive and while the device is in an audio control mode, detect a contact on the device at a location corresponding to the rotatable input mechanism, where the contact does not cause the device to activate the display.

1104
In response to the location of the contact being detected at a first position relative to the rotatable input mechanism, provide first audio control data to the audio output communicator, where the first audio control data is associated with an audio function.

> Optionally, the first audio control data is associated with changing a volume at which audio content is played.

> Optionally, the first audio control data is associated with changing the audio content being played.

1106
Optionally, in response to the location of the contact being detected at a second position relative to the rotatable input mechanism, forgo providing the first audio control data to the audio output device.

1108
Optionally, in response to the location of the contact being detected at a second position relative to the rotatable input mechanism, provide second audio control data to the audio output device, wherein the second audio control data is associated with a second audio function.

*FIG. 11*

GESTURE DETECTION, LIST NAVIGATION, AND ITEM SELECTION USING A CROWN AND SENSORS

CROSS-REFERENCE TO RELATED APPLICATIONS

This application claims priority to U.S. provisional patent application 62/396,732, entitled "GESTURE DETECTION, LIST NAVIGATION, AND ITEM SELECTION USING A CROWN AND SENSORS", filed on Sep. 19, 2016, the content of which is hereby incorporated by reference in its entirety.

FIELD

The present disclosure relates generally to computer user interfaces, and more specifically to techniques for navigating lists and selecting items using a digital crown and sensors.

BACKGROUND

Reduced-size electronic devices have smaller screen sizes than other types of electronic devices, thereby potentially presenting usability challenges. For example, some reduced-size devices with touch screen interfaces require users to select items from a list by touching the items on the touch screen. However, for devices with small screen sizes, users may have difficulty providing sufficiently accurate touch inputs on the touch screen. Moreover, providing touch inputs on a small screen may obscure a relatively large portion of the displayed content, which can increase the likelihood of inaccurate or unwanted inputs and responses. Devices and user interfaces that allow a user to provide inputs off of the display can increase device efficiency and usability.

BRIEF SUMMARY

Reduced-size devices that allow a user to provide inputs off of the display can alleviate problems with obscuring content on a small display screen. However, there are challenges in providing other input modes (e.g., input modes that do not require the user to touch the display). For example, reduced-size devices are typically too small to accommodate a physical keyboard. Some reduced-size devices include one or more physical buttons, but these may not provide the user with a sufficient variety of input modes to enable efficient interfaces. Other external input devices, such as mice or trackballs, are unattractive solutions for use with reduced-size devices, particularly for wearable reduced-size devices such as smart watches. Existing user interfaces, which are typically based on touch screens, can result in frequent erroneous device responses since the user often cannot readily view the screen while providing inputs, thus wasting user time and device energy. This latter consideration is particularly important in battery-operated devices.

Accordingly, the present techniques provide reduced-size electronic devices with faster, more efficient methods and interfaces for enabling list navigation, item selection, and other control options. Such methods and interfaces optionally complement or replace other methods for list navigation and item selection. Such methods and interfaces reduce the cognitive burden on a user and produce a more efficient human-machine interface. Such methods can reduce the inputs required to navigate a list and select an item (or provide other control inputs), thereby reducing the device's processing and memory usage requirements. For battery-operated computing devices, such methods and interfaces conserve power and increase the time between battery charges.

In accordance with some embodiments, a method is performed at an electronic device with a display, a housing, and a rotatable input mechanism. The method includes: receiving a request to display items; in response to receiving the request, displaying, on the display, a user interface including a plurality of items with a focus selector associated with one or more of the plurality of items; detecting a contact on the device at a location corresponding to the rotatable input mechanism; in response to the location of the contact being detected at a first position relative to the rotatable input mechanism, executing a process on the one or more items associated with the focus selector; and in response to the location of the contact being detected at a second position relative to the rotatable input mechanism, forgoing execution of the process on the one or more items associated with the focus selector, wherein the second position is distinct from the first position.

In accordance with some embodiments, a method is performed at an electronic device with a display and a rotatable input mechanism. The method includes: displaying, on the display, a user interface including a plurality of items with a focus selector associated with a first group of one or more items of the plurality of items; detecting a user input corresponding to a rotation of the rotatable input mechanism, wherein the user input includes a contact with the rotatable input mechanism; in response to detecting the rotation, scrolling the plurality of items and associating the focus selector with a second group of one or more items in accordance with the rotation; determining whether the contact has been removed from the rotatable input mechanism while the second group of one or more items is associated with the focus selector; in accordance with a determination that the contact has been removed while the second group of one or more items is associated with the focus selector, executing a process on the second group of one or more items; and in accordance with a determination that the contact has not been removed while the second item is in focus, forgoing executing the process on the second group of one or more items.

In accordance with some embodiments, a method is performed at an electronic device with a display and a rotatable input mechanism. The method includes: displaying, on the display, a first user interface screen; while displaying the first user interface screen, detecting a swipe gesture starting at a location corresponding to the rotatable input mechanism; determining the direction of the swipe relative to the rotatable input mechanism; and replacing display of the first user interface screen with display of a second user interface screen in accordance with the determined direction of the swipe relative to the rotatable input mechanism.

In accordance with some embodiments, a method is performed at an electronic device with a display and a rotatable input mechanism. The method includes: displaying, on the display, a portion of an electronic document; detecting a swipe gesture on the device at a location corresponding to the rotatable input mechanism; determining the direction of the swipe gesture relative to the rotatable input mechanism; and translating the display of the document in accordance with the determined direction of the swipe gesture.

In accordance with some embodiments, a method is performed at an electronic device with a display, a housing, a rotatable input mechanism, and an audio output communicator. The method includes: while the display is inactive and while the device is in an audio control mode, detecting a contact on the device at a location corresponding to the rotatable input mechanism, wherein the contact does not cause the device to activate the display; and in response to the location of the contact being detected at a first position relative to the rotatable input mechanism, providing first audio control data to the audio output communicator, wherein the first audio control data is associated with an audio function.

In accordance with some embodiments, a device comprises a display; a housing; a rotatable input mechanism; one or more processors; memory; and one or more programs stored in memory, including instructions that, when executed by the one or more processors, cause the device to: receive a request to display items; in response to receiving the request, display, on the display, a user interface including a plurality of items with a focus selector associated with one or more of the plurality of items; detect a contact on the device at a location corresponding to the rotatable input mechanism; in response to the location of the contact being detected at a first position relative to the rotatable input mechanism, execute a process on the one or more items associated with the focus selector; and in response to the location of the contact being detected at a second position relative to the rotatable input mechanism, forgo execution of the process on the one or more items associated with the focus selector, wherein the second position is distinct from the first position.

In accordance with some embodiments, a device comprises: a display; a rotatable input mechanism; one or more processors; memory; and one or more programs stored in memory, including instructions that, when executed by the one or more processors, cause the device to: display, on the display, a user interface including a plurality of items with a focus selector associated with a first group of one or more items of the plurality of items; detect a user input corresponding to a rotation of the rotatable input mechanism, wherein the user input includes a contact with the rotatable input mechanism; in response to detecting the rotation, scroll the plurality of items and associate the focus selector with a second group of one or more items in accordance with the rotation; determine whether the contact has been removed from the rotatable input mechanism while the second group of one or more items is associated with the focus selector; in accordance with a determination that the contact has been removed while the second group of one or more items is associated with the focus selector, execute a process on the second group of one or more items; and in accordance with a determination that the contact has not been removed while the second item is in focus, forgo executing the process on the second group of one or more items.

In accordance with some embodiments, a device comprises: a display; a rotatable input mechanism; one or more processors; memory; and one or more programs stored in memory, including instructions that, when executed by the one or more processors, cause the device to: display, on the display, a first user interface screen; while displaying the first user interface screen, detect a swipe gesture starting at a location corresponding to the rotatable input mechanism; determine the direction of the swipe relative to the rotatable input mechanism; and replace display of the first user interface screen with display of a second user interface screen in accordance with the determined direction of the swipe relative to the rotatable input mechanism.

In accordance with some embodiments, a device comprises: a display; a rotatable input mechanism; one or more processors; memory; and one or more programs stored in memory, including instructions that, when executed by the one or more processors, cause the device to: display, on the display, a portion of an electronic document; detect a swipe gesture on the device at a location corresponding to the rotatable input mechanism; determine the direction of the swipe gesture relative to the rotatable input mechanism; and translate the display of the document in accordance with the determined direction of the swipe gesture.

In accordance with some embodiments, a device comprises: a display; a housing; a rotatable input mechanism; an audio output communicator; one or more processors; memory; and one or more programs stored in memory, including instructions that, when executed by the one or more processors, cause the device to: while the display is inactive and while the device is in an audio control mode, detect a contact on the device at a location corresponding to the rotatable input mechanism, wherein the contact does not cause the device to activate the display; and in response to the location of the contact being detected at a first position relative to the rotatable input mechanism, provide first audio control data to the audio output communicator, wherein the first audio control data is associated with an audio function.

In accordance with some embodiments, a non-transitory computer-readable storage medium comprises one or more programs for execution by one or more processors of an electronic device with a display, a housing, and a rotatable input mechanism, the one or more programs including instructions which, when executed by the one or more processors, cause the electronic device to: receive a request to display items; in response to receiving the request, display, on the display, a user interface including a plurality of items with a focus selector associated with one or more of the plurality of items; detect a contact on the device at a location corresponding to the rotatable input mechanism; in response to the location of the contact being detected at a first position relative to the rotatable input mechanism, execute a process on the one or more items associated with the focus selector; and in response to the location of the contact being detected at a second position relative to the rotatable input mechanism, forgo execution of the process on the one or more items associated with the focus selector, wherein the second position is distinct from the first position.

In accordance with some embodiments, a non-transitory computer-readable storage medium comprises one or more programs for execution by one or more processors of an electronic device with a display and a rotatable input mechanism, the one or more programs including instructions which, when executed by the one or more processors, cause the electronic device to: display, on the display, a user interface including a plurality of items with a focus selector associated with a first group of one or more items of the plurality of items; detect a user input corresponding to a rotation of the rotatable input mechanism, wherein the user input includes a contact with the rotatable input mechanism; in response to detecting the rotation, scroll the plurality of items and associating the focus selector with a second group of one or more items in accordance with the rotation; determine whether the contact has been removed from the rotatable input mechanism while the second group of one or more items is associated with the focus selector; in accordance with a determination that the contact has been removed while the second group of one or more items is associated with the focus selector, execute a process on the second group of one or more items; and in accordance with a determination that the contact has not been removed while the second item is in focus, forgo executing the process on the second group of one or more items.

In accordance with some embodiments, a non-transitory computer-readable storage medium comprises one or more programs for execution by one or more processors of an electronic device with a display and a rotatable input mechanism, the one or more programs including instructions which, when executed by the one or more processors, cause the electronic device to: display, on the display, a first user interface screen; while displaying the first user interface screen, detect a swipe gesture starting at a location corresponding to the rotatable input mechanism; determine the direction of the swipe relative to the rotatable input mechanism; and replace display of the first user interface screen with display of a second user interface screen in accordance with the determined direction of the swipe relative to the rotatable input mechanism.

In accordance with some embodiments, a non-transitory computer-readable storage medium comprises one or more programs for execution by one or more processors of an electronic device with a display and a rotatable input mechanism, the one or more programs including instructions which, when executed by the one or more processors, cause the electronic device to: display, on the display, a portion of an electronic document; detect a swipe gesture on the device at a location corresponding to the rotatable input mechanism; determine the direction of the swipe gesture relative to the rotatable input mechanism; and translate the display of the document in accordance with the determined direction of the swipe gesture.

In accordance with some embodiments, a non-transitory computer-readable storage medium comprises one or more programs for execution by one or more processors of an electronic device with a display, a housing, a rotatable input mechanism, and an audio output communicator, the one or more programs including instructions which, when executed by the one or more processors, cause the electronic device to: while the display is inactive and while the device is in an audio control mode, detect a contact on the device at a location corresponding to the rotatable input mechanism, wherein the contact does not cause the device to activate the display; and in response to the location of the contact being detected at a first position relative to the rotatable input mechanism, provide first audio control data to the audio output communicator, wherein the first audio control data is associated with an audio function.

In accordance with some embodiments, a transitory computer-readable storage medium comprises one or more programs for execution by one or more processors of an electronic device with a display, a housing, and a rotatable input mechanism, the one or more programs including instructions which, when executed by the one or more processors, cause the electronic device to: receive a request to display items; in response to receiving the request, display, on the display, a user interface including a plurality of items with a focus selector associated with one or more of the plurality of items; detect a contact on the device at a location corresponding to the rotatable input mechanism; in response to the location of the contact being detected at a first position relative to the rotatable input mechanism, execute a process on the one or more items associated with the focus selector; and in response to the location of the contact being detected at a second position relative to the rotatable input mechanism, forgo execution of the process on the one or more items associated with the focus selector, wherein the second position is distinct from the first position.

In accordance with some embodiments, a transitory computer-readable storage medium comprises one or more programs for execution by one or more processors of an electronic device with a display and a rotatable input mechanism, the one or more programs including instructions which, when executed by the one or more processors, cause the electronic device to: display, on the display, a user interface including a plurality of items with a focus selector associated with a first group of one or more items of the plurality of items; detect a user input corresponding to a rotation of the rotatable input mechanism, wherein the user input includes a contact with the rotatable input mechanism; in response to detecting the rotation, scroll the plurality of items and associating the focus selector with a second group of one or more items in accordance with the rotation; determine whether the contact has been removed from the rotatable input mechanism while the second group of one or more items is associated with the focus selector; in accordance with a determination that the contact has been removed while the second group of one or more items is associated with the focus selector, execute a process on the second group of one or more items; and in accordance with a determination that the contact has not been removed while the second item is in focus, forgo executing the process on the second group of one or more items.

In accordance with some embodiments, a transitory computer-readable storage medium comprises one or more programs for execution by one or more processors of an electronic device with a display and a rotatable input mechanism, the one or more programs including instructions which, when executed by the one or more processors, cause the electronic device to: display, on the display, a first user interface screen; while displaying the first user interface screen, detect a swipe gesture starting at a location corresponding to the rotatable input mechanism; determine the direction of the swipe relative to the rotatable input mechanism; and replace display of the first user interface screen with display of a second user interface screen in accordance with the determined direction of the swipe relative to the rotatable input mechanism.

In accordance with some embodiments, a transitory computer-readable storage medium comprises one or more programs for execution by one or more processors of an electronic device with a display and a rotatable input mechanism, the one or more programs including instructions which, when executed by the one or more processors, cause the electronic device to: display, on the display, a portion of an electronic document; detect a swipe gesture on the device at a location corresponding to the rotatable input mechanism; determine the direction of the swipe gesture relative to the rotatable input mechanism; and translate the display of the document in accordance with the determined direction of the swipe gesture.

In accordance with some embodiments, a transitory computer-readable storage medium comprises one or more programs for execution by one or more processors of an electronic device with a display, a housing, a rotatable input mechanism, and an audio output communicator, the one or more programs including instructions which, when executed by the one or more processors, cause the electronic device to: while the display is inactive and while the device is in an audio control mode, detect a contact on the device at a location corresponding to the rotatable input mechanism, wherein the contact does not cause the device to activate the display; and in response to the location of the contact being detected at a first position relative to the rotatable input mechanism, provide first audio control data to the audio output communicator, wherein the first audio control data is associated with an audio function.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for list navigation and item selection, thereby increasing the effectiveness, efficiency, and user satisfaction with such devices. Such methods and interfaces may complement or replace other methods for list navigation and item selection.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 10 illustrates a flow diagram of an exemplary method for detecting gestures and navigating electronic documents in accordance with some embodiments.

FIG. 11 illustrates a flow diagram of an exemplary method for detecting gestures and controlling audio functions in accordance with some embodiments.

DESCRIPTION OF EMBODIMENTS

Figure 1A:
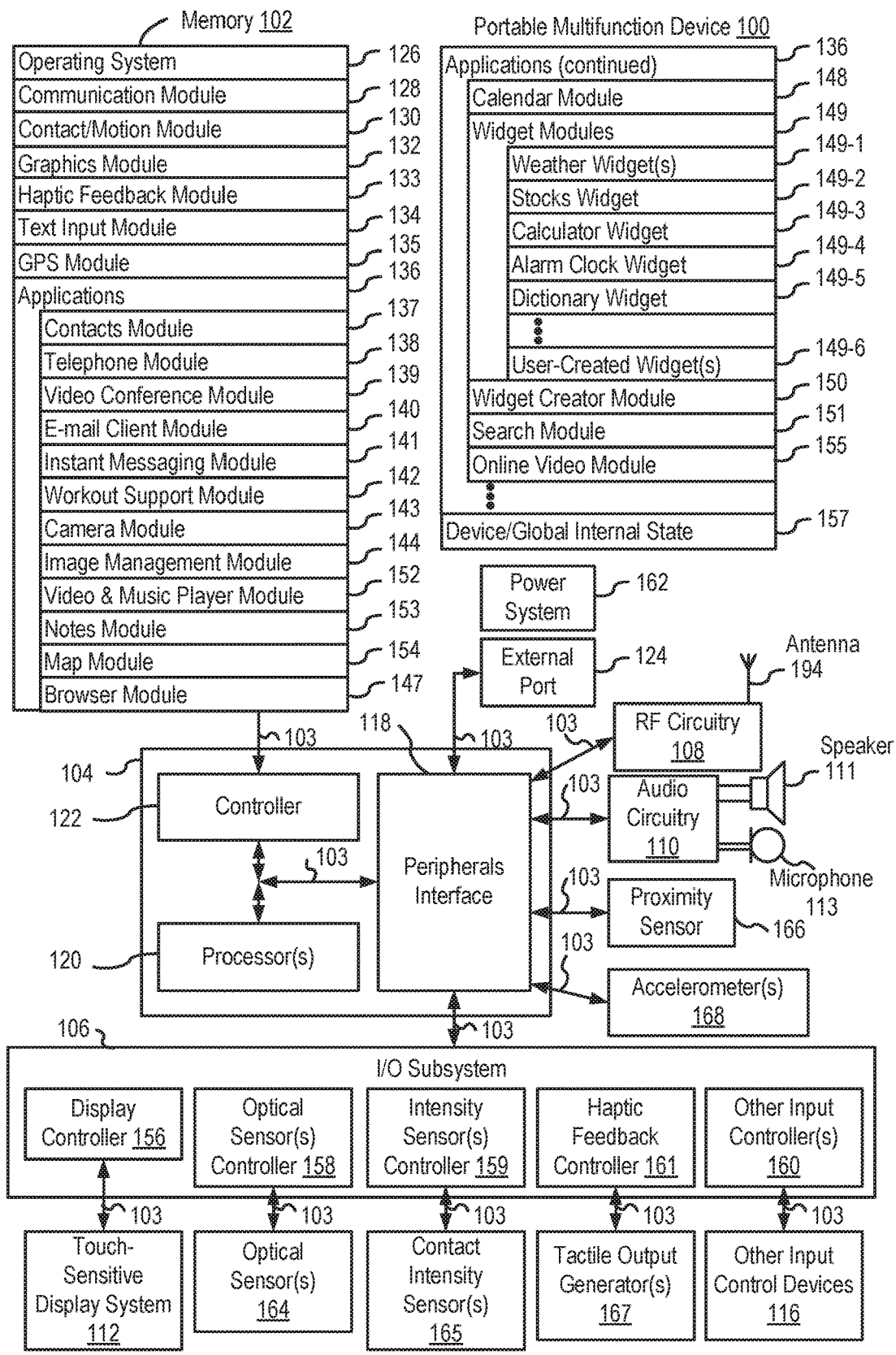
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for reduced-size electronic devices that provide efficient methods and interfaces for navigating lists and selecting an item(s) without requiring the user to touch a touch screen. For example, as discussed above, it can be advantageous for a reduced-size device with a small display screen to allow a user to navigate a list and select an item(s) without having to touch the display and potentially obscure items on the list. A further advantage of allowing the user to provide inputs off of the display is that, in some cases, the device can receive user inputs and respond to them without activating the display, thereby saving power.

Below, FIGS. 1A-1B, 2, 3, 4A-4B, and 5A-5B provide a description of exemplary devices for performing the gesture detection, list navigation, item selection, and other control techniques described with respect to FIGS. 6A-6X and FIGS. 7-11. FIGS. 6A-6X illustrate exemplary user interfaces for gesture detection, list navigation, item selection, document translation, and control of audio functions. FIGS. 7-11 are flow diagrams illustrating methods of gesture detection, list navigation, and item selection, document translation, and control of external audio devices in accordance with some embodiments. The user interfaces and diagrams in FIGS. 6A-6X are used to illustrate the processes described below, including the processes in FIGS. 7-11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, antenna 194, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
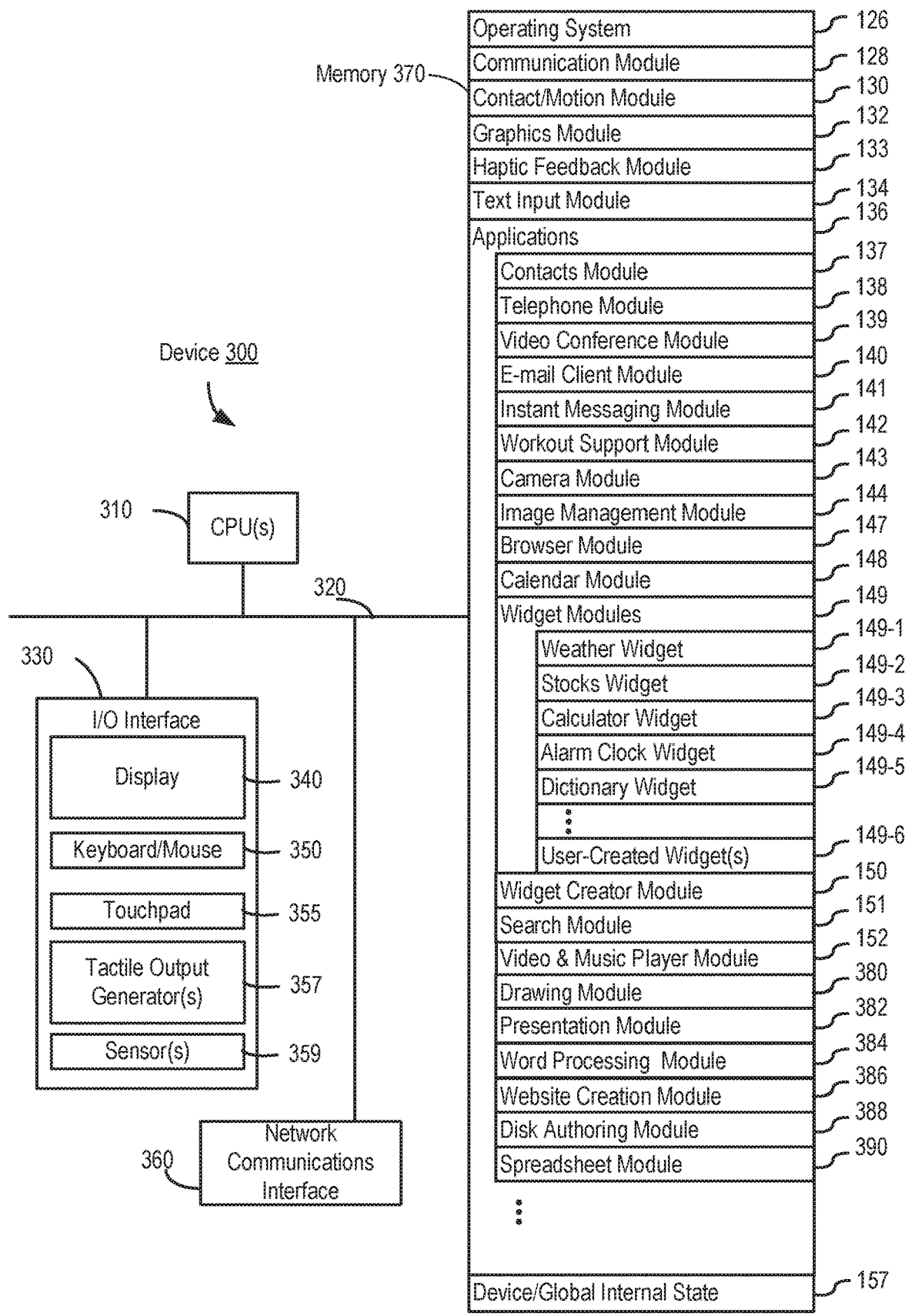
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX UNIX OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
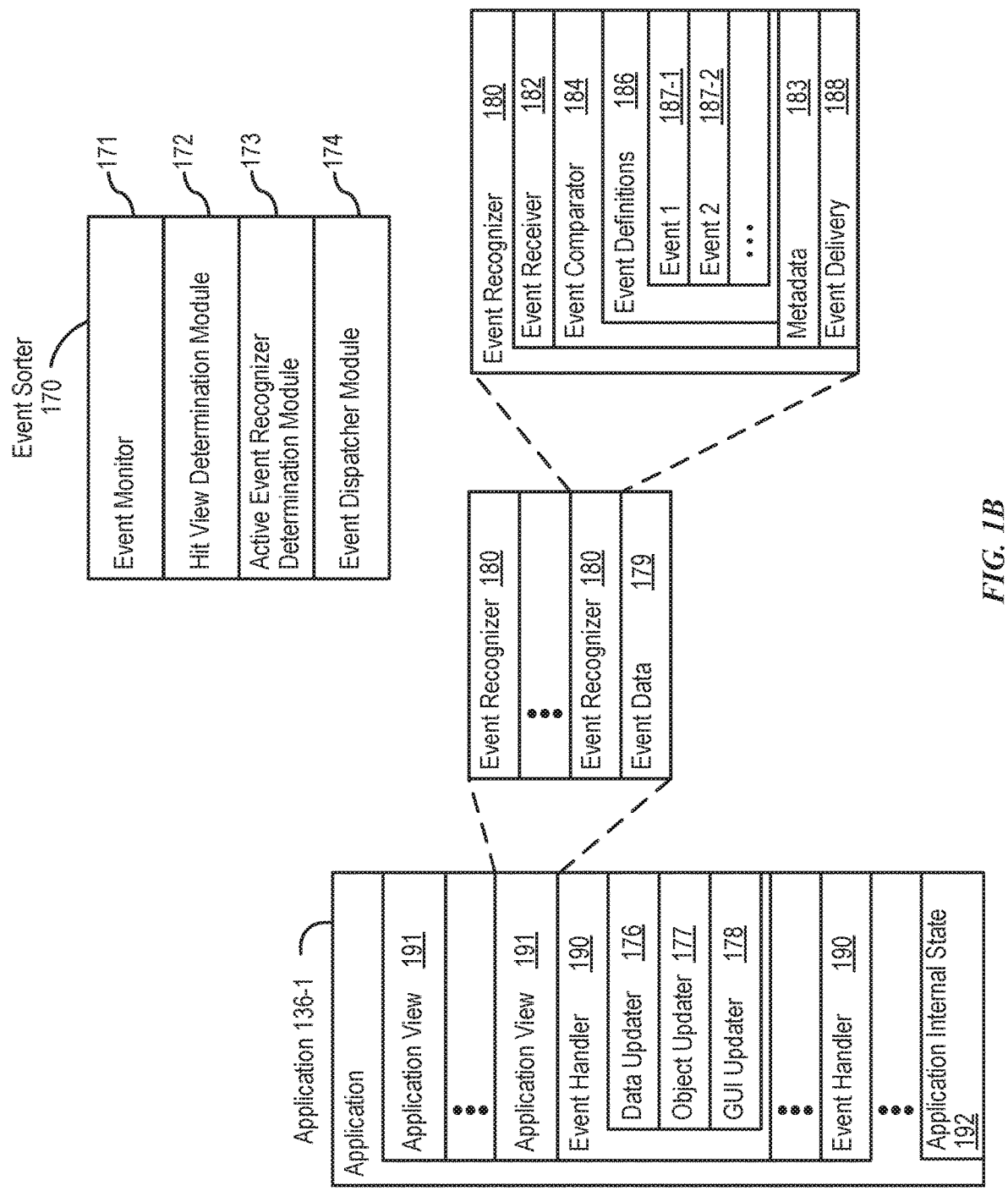
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
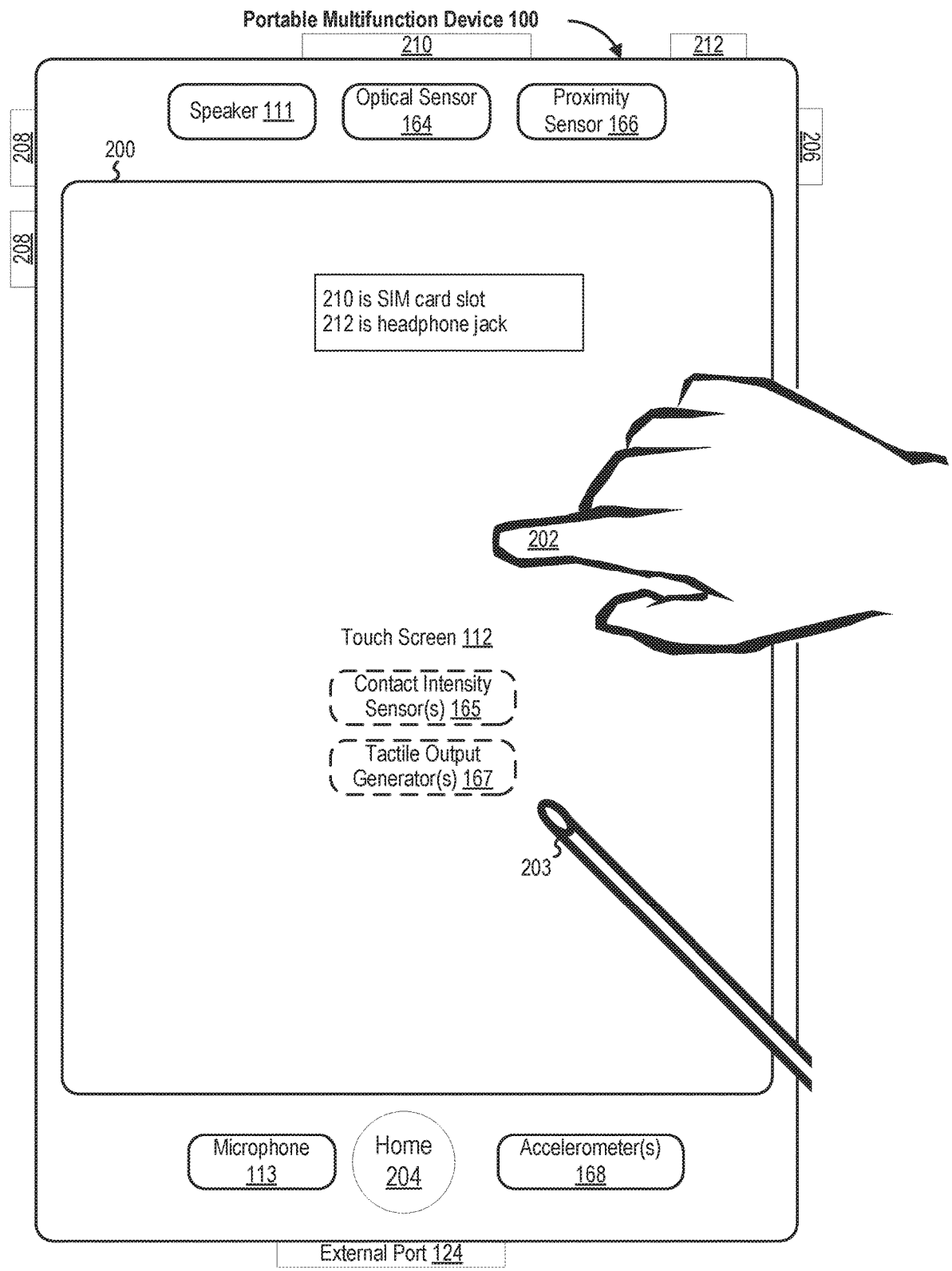
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
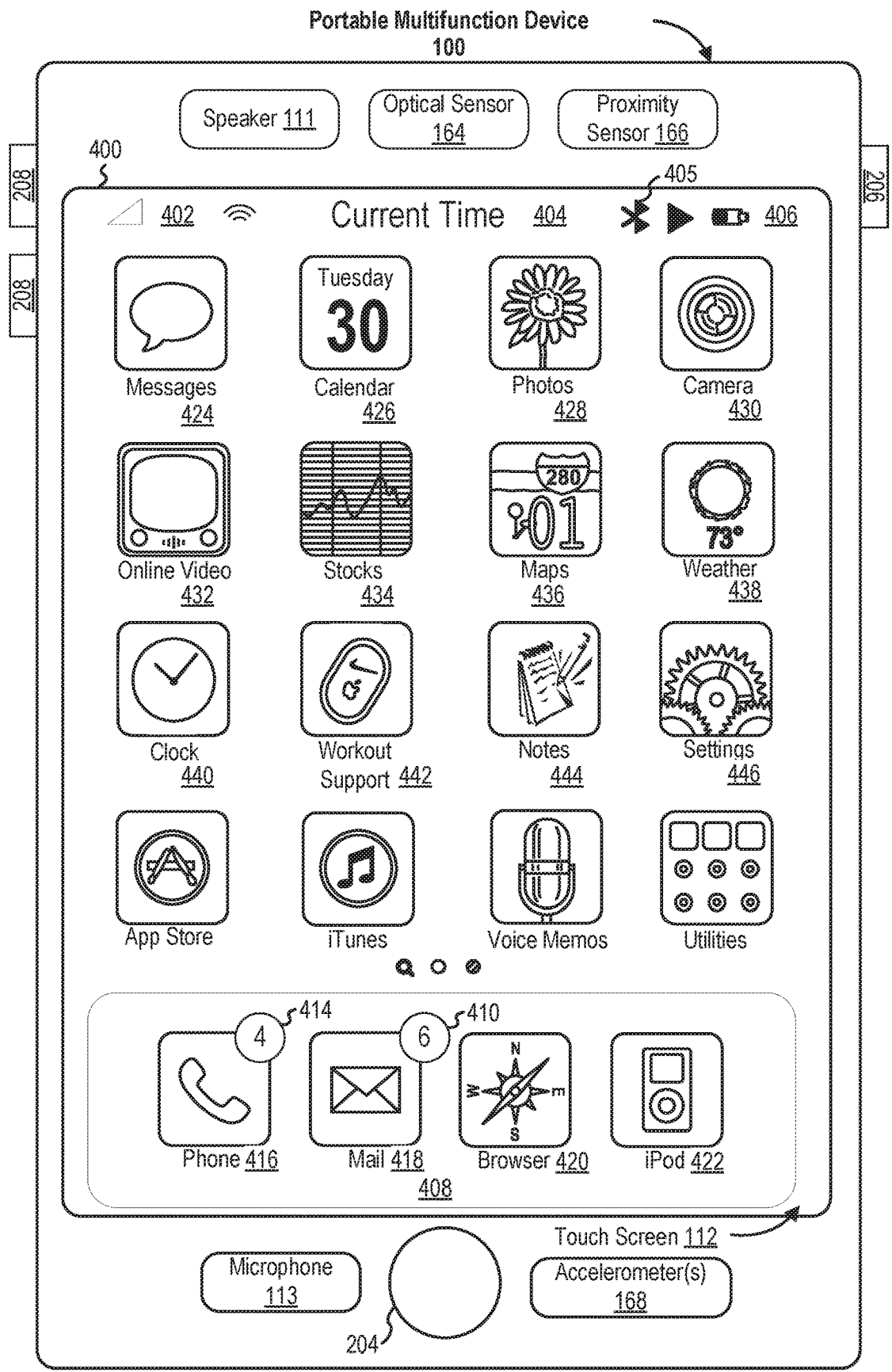
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
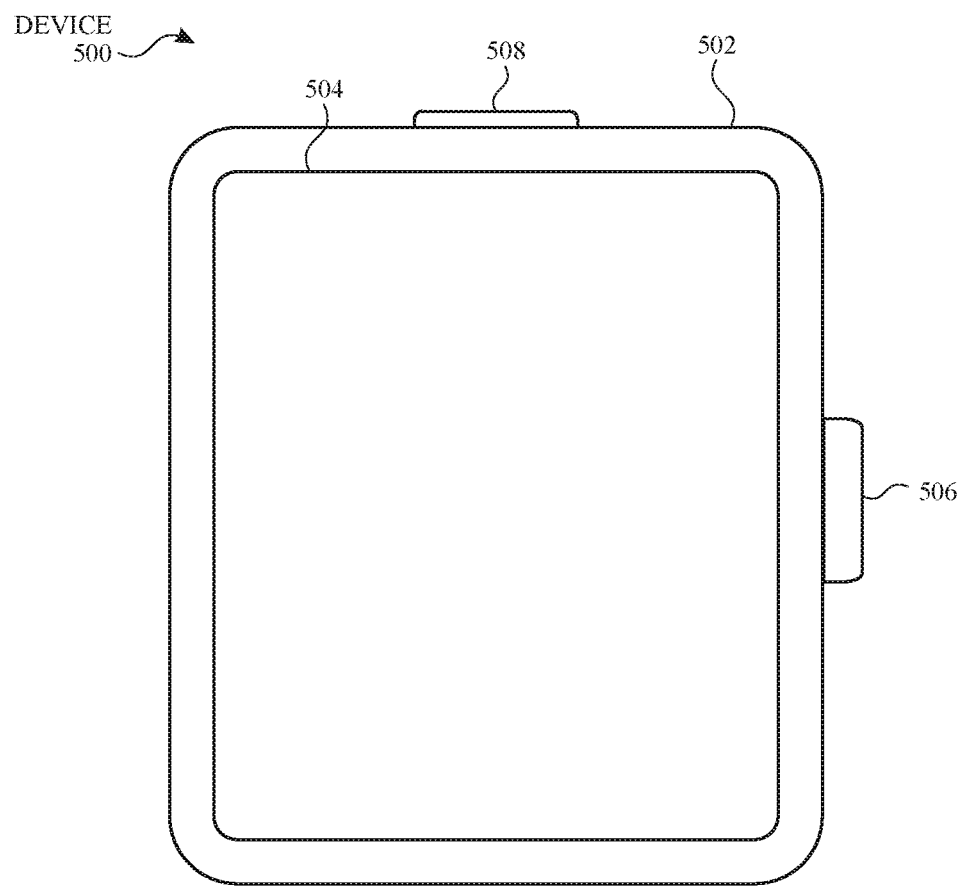
FIG. 5A illustrates a personal electronic device in accordance with some embodiments.

FIG. 5A illustrates exemplary personal electronic device 500. Device 500 includes a body or housing 502 for enclosing a portion of device 500. Housing 502 can include a bezel (if present) of device 500. In some embodiments, device 500 can include some or all of the features described with respect to devices 100 and 300 (e.g., FIGS. 1A-4B). In some embodiments, device 500 has touch-sensitive display screen 504, hereafter touch screen 504. Touch screen 504 is not part of housing 502. Alternatively, or in addition to touch screen 504, device 500 has a display and a touch-sensitive surface; the display and touch-sensitive surface, if included, are not part of housing 502. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
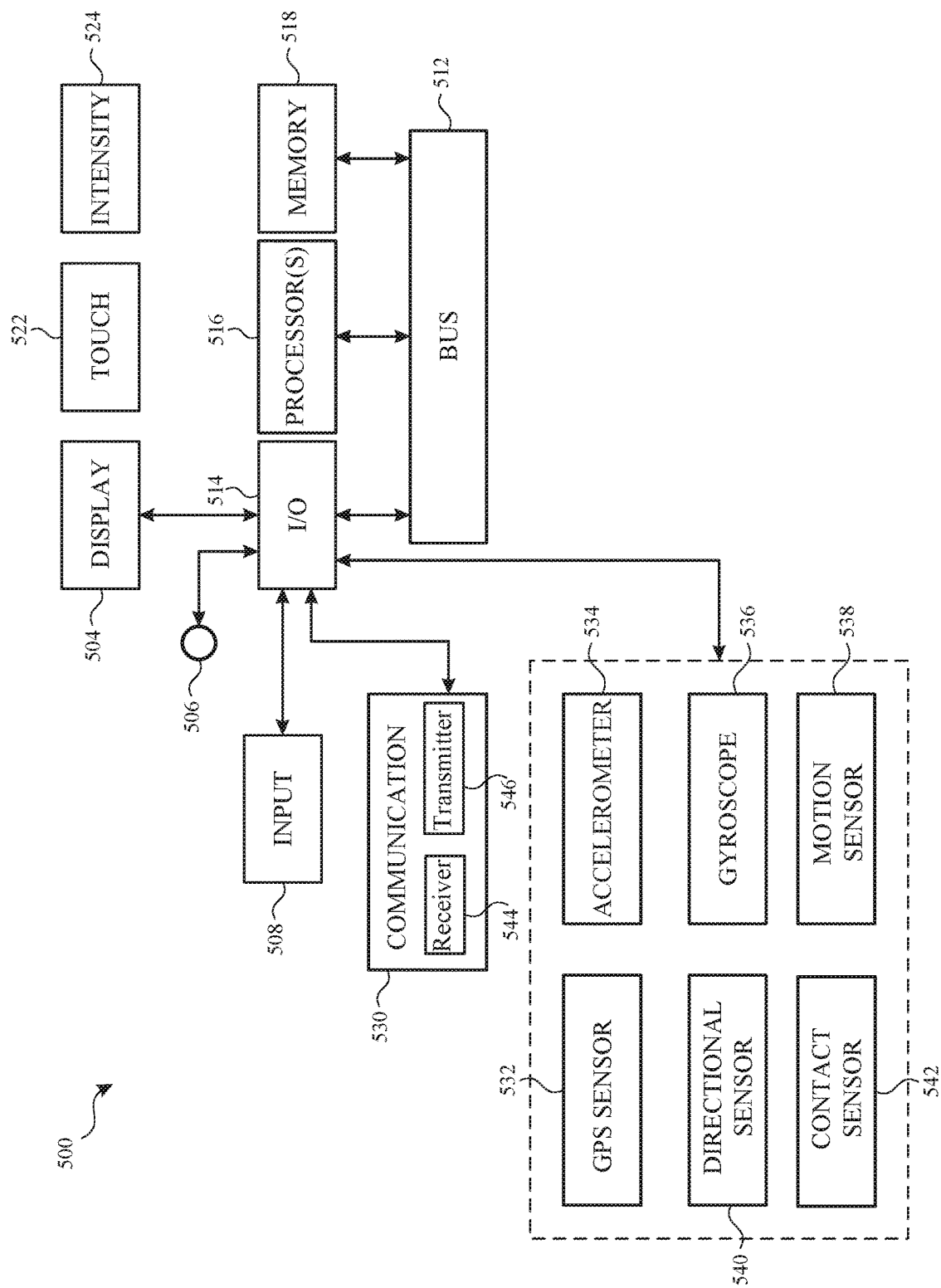
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input mechanism or a depressible and rotatable input mechanism, for example, such as a digital crown for a watch. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

In some embodiments, device 500 includes one or more contact sensors 542 configured to detect contacts on device 500 that are off of touch screen 504, such as contacts on housing 502, contacts on input mechanism 506, and/or contacts on input mechanism 508. In some embodiments, contact sensor 542 is configured to detect a location of the contact, relative to input mechanism 506. For example, in some embodiments, contact sensor 542 is configured to detect that a touch, tap, or double-tap received on housing 502 is at a location above or below input mechanism 506.

In some embodiments, contact sensor 542 is configured to detect a swipe gesture on housing 502 or on input mechanism 506. In some embodiments, contact sensor 542 is configured to determine the direction of the swipe gesture relative to input mechanism 506.

In some embodiments, contact sensor 542 is configured to detect contacts anywhere on housing 502. In some embodiments, contact sensor 542 is configured to detect contacts on certain areas of housing 502, such as on a portion of housing 502 that is on the same side of the device as input mechanism 506.

In some embodiments, contact sensor 542 includes a capacitive sensor. In some embodiments, contact sensor 542 includes an optical sensor. In some embodiments, contact sensor 542 includes an accelerometer, such as accelerometer 534. In some embodiments, contact sensor 542 includes an antenna, such as antenna 194 in FIG. 1A.

Contact sensor 542 can be located in a wide variety of locations on device 500. In some embodiments, contact sensor 542 is located beneath touch screen 502. In some embodiments, contact sensor 542 is located beneath housing 502. In some embodiments, contact sensor 542 is located within input mechanism 506.

In some embodiments, the physical location of contact sensor 542 on device 500 does not dictate the specific areas at which contact sensor 542 can detect contacts on device 500; e.g., contact sensor 542 can be physically located beneath touch screen 504 and configured to detect contacts on housing 502 and/or on input mechanism 506.

In some embodiments, contact sensor 542 is configured to detect contacts on touch screen 502 in addition to being configured to detect contacts on housing 502 and/or on input mechanism 506.

Memory 518 of personal electronic device 500 can include one or more a non-transitory computer-readable storage mediums, for storing computer-executable instructions, which, when executed by one or more computer processors 516, for example, can cause the computer processors to perform the techniques described below, including processes 700-1100 (FIGS. 7-11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts)

above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6K illustrate processes device 500 can execute to enable a user to navigate a list (or other group) of items and select one or more items in the list by touching device 500 at a location that is off of the display; e.g., by touching device 500 on housing 502 or on rotatable input mechanism 506. In some embodiments, housing 502 and rotatable input mechanism 506 of device 500 provide touch-sensitive areas on which a user can provide touch inputs to device 500 without necessarily touching touch screen 504, and without causing mechanical actuation of any input mechanism on device 500, such as input mechanisms 506, 508. In some embodiments, device 500 detects contacts on housing 502 and rotatable input mechanism 506 using contact sensor 542, as previously described with respect to FIG. 5B.

The user interfaces depicted in FIGS. 6A-6K are used to illustrate the processes described below, including the processes in FIG. 7.

As will be discussed in more detail below, in some embodiments, device 500 can respond to contacts on housing 502 or on rotatable input mechanism 506 differently depending on the position of the contact relative to rotatable input mechanism 506. For example, device 500 can respond to a contact on housing 502 at a position that is above rotatable input mechanism 506 differently than device 500 responds to a contact on housing 502 at a position that is below rotatable input mechanism 506. As another example, device 500 can respond to a contact on housing 502 differently than device 500 responds to a contact on rotatable input mechanism 506.

FIG. 6A depicts an exemplary user interface 606 that is, optionally, displayed by device 500 in response to detecting a user's request to display items. The user request may be a contact on touch screen 504 (e.g., a selection of an icon), an activation of button 508, a rotation of rotatable input mechanism 506, or a movement of device 500 such as a user raising device 500 into view (as detected by, e.g., accelerometer on device 500), for example.

User interface 606 includes a list of items 608 and a focus selector 604 associated with one of the items. In exemplary user interface 606, the list of items 608 is a list of replies from which a user can select a reply to send as an electronic message to another user. In FIG. 6A, focus selector 604 is associated with the "Yes" reply.

While displaying list 608, in response to detecting a contact on device 500 corresponding to rotatable input mechanism 506 at a first position relative to rotatable input mechanism 506, device 500 sends the reply associated with focus selector 604 as an electronic message to an external device, such as device 600 depicted in FIG. 6B. The external device may be a device that is associated with another user, for example. In the example depicted in FIG. 6A, the contact corresponding to rotatable input mechanism 506 is a finger touch on housing 502 at a position 602 that is above rotatable input mechanism 506 (e.g., closer to the top of the device than to the bottom), when viewed in the orientation depicted in FIG. 6A. Thus, a contact corresponding to rotatable input mechanism 506 need not be on rotatable input mechanism 506.

In some embodiments, the contact corresponding to the rotatable input mechanism is a portion of a gesture that includes a tap. For example, the contact may include a single tap or a double tap.

As depicted in the example of FIG. 6A, in some embodiments, the contact corresponding to rotatable input mechanism 506 does not activate a mechanically actuated input mechanism on device 500 (e.g., it does not cause a depression of button 508 or a rotation of rotatable input mechanism 506). That is, the contact can be a touch, tap, double-tap, or swipe on housing 502 or a touch, tap, double-tap, or swipe on input mechanism 506, 508 that does not cause mechanical actuation of input mechanism 506, 508.

As depicted in the example of FIG. 6A, in some embodiments, the contact corresponding to the rotatable input mechanism does not include any contact with touch screen 504; e.g., the contact is entirely off of the display. In some embodiments, the contact may include a portion of the contact that is on the display and a portion of the contact that is off of the display, such as a swipe that begins on touch screen 504 and ends on housing 502.

Returning to FIG. 6A, as previously described, in response to detecting the contact on housing 502 at a first position relative to rotatable input mechanism 506 (in this case, at a position 602 that is above rotatable input mechanism 506), device 500 sends the reply associated with focus selector 604 ("Yes") as an electronic message to external device 600. Thus, FIGS. 6A-6B illustrate processes device 500 can execute to enable a user to navigate a list and select an item for processing. In this case, processing the item includes sending the item as an electronic message to an external device.

In some embodiments, device 500 can execute different processes depending on the location of the contact corresponding to rotatable input mechanism 506. For example, while displaying user interface 606, if device 500 detects a contact at a second position relative to rotatable input mechanism 506 (instead of at position 602 as depicted in FIG. 6A) device 500 can forgo sending the reply associated with focus selector 604.

As depicted in FIG. 6C, in some embodiments, in response to detecting a contact at a second position 612 relative to rotatable input mechanism 506, device 500 executes a different process than the process device 500 executes in response to detecting the contact at the first position 602. In the example of FIG. 6C, the second process includes replacing display of user interface 606 with display of user interface 610.

Thus, in some embodiments, if a user touches the housing of device 500 at a first position relative to rotatable input mechanism 506 while device 500 is displaying list 608, device 500 responds by executing a first process on the item(s) associated with the focus selector 604, such as depicted in FIGS. 6A-B. However, if the user touches the housing at a second position relative to rotatable input mechanism 506 (distinct from the first position), device 500 responds by executing a second process, such as depicted in FIGS. 6C-D.

Figure 6E:
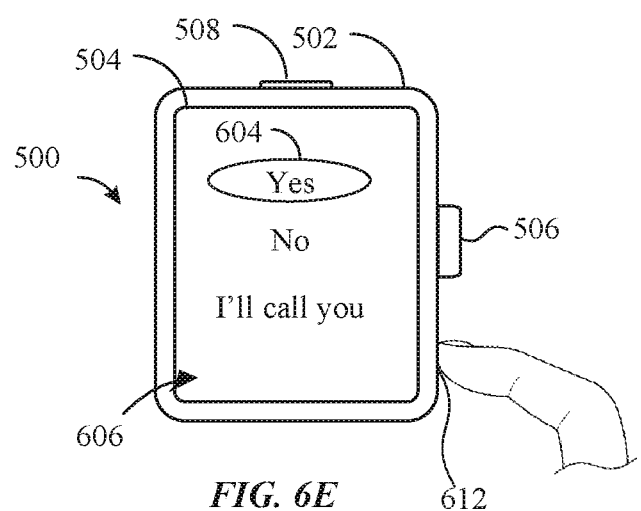
FIGS. 6A-V illustrate exemplary user interfaces in accordance with some embodiments.
FIG. 6W illustrates an exemplary device block diagram in accordance with some embodiments.
FIG. 6X illustrates an exemplary user interface in accordance with some embodiments.
Figure 6F:
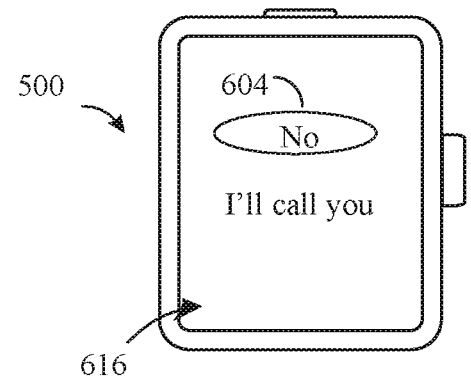

In this example, the second process is independent of the item(s) associated with the focus selector. However, in some embodiments, device 500 executes a second process on the item(s) associated with focus selector 604. For example, instead of replacing display of user interface 606 with display of user interface 610 as depicted in FIG. 6C, device 500 may instead execute a second process on the item associated with focus selector 604, as depicted in FIGS. 6E-6F. In this example, in response to the location of the contact being detected at position 612, the device executes a second process that includes dismissing the item ("Yes") associated with focus selector 604 by removing it from the displayed list, and changing the item associated with focus selector 604 to "No."

In some embodiments, the first and/or second process includes dismissing items that are not associated with the focus selector (e.g., in FIG. 6E, dismissing "No" and "I'll call you," instead of dismissing "Yes" as described above). Dismissing the items may include removing the items from the list, removing the items from the display, or deleting the items, for example.

In some embodiments, the first and/or second process includes selecting the item(s) associated with the focus selector for further processing; e.g., placing the item in a text field, displaying the item in a full-screen view, or opening an application associated with the item. For example, if the list of items is a list of email addresses, the first and/or second process may include placing an email address associated with the focus selector into an addressee text field or launching an email application.

As previously discussed, in some embodiments, executing the second process includes displaying a second user interface; e.g., by, replacing display of the (first) user interface with a second user interface, such as depicted in FIGS. 6C-6D, where user interface 606 is replaced with user interface 610. In some embodiments, the second user interface is associated with an open application, such as an application that is executing in the background on device 500. In some embodiments, the second user interface is associated with an application that is launched as part of executing the second process.

Figure 6G:
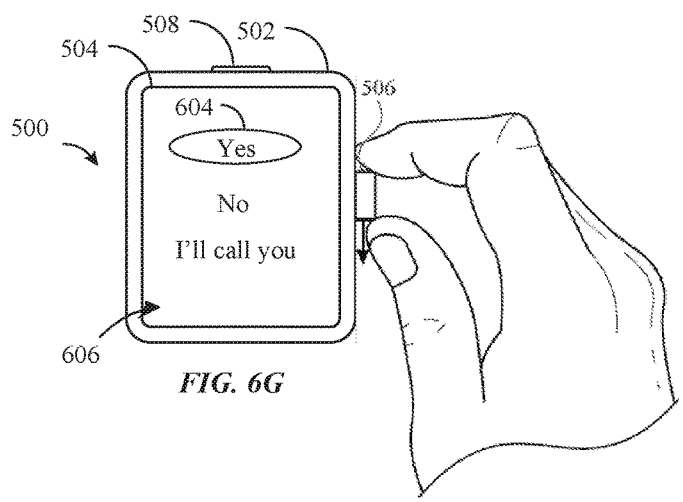
Figure 6H:
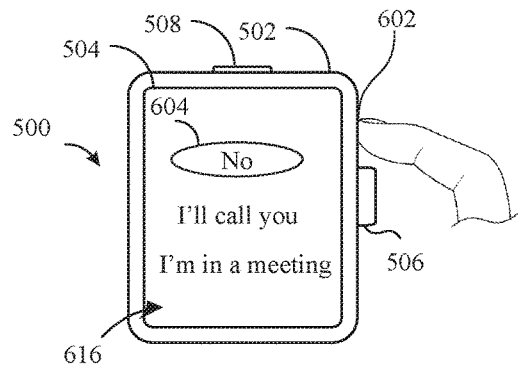
Figure 6I:
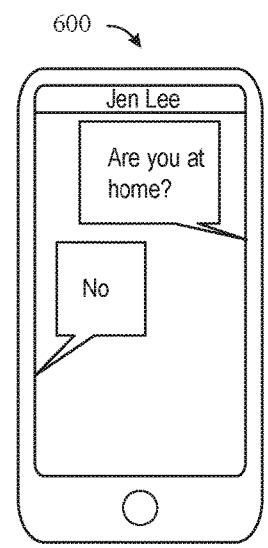

Turning to FIGS. 6G-6I, in some embodiments, in response to detecting a scroll input while displaying user interface 606, device 500 scrolls the list of items and changes the item(s) associated with the focus selector in accordance with the scroll input. In this example, the scroll input is a rotation of rotatable input mechanism 506, and as depicted in FIGS. 6G-6H, scrolling the list changes the item associated with the focus selector 604 from "Yes" to "No."

In some embodiments, the scroll input may be a swipe on touch screen 504 or a swipe on housing 502.

In this example, device 500 allows a user to scroll through the list of items by rotating rotatable input mechanism 506, and then select an item for processing ("No") by touching housing 502, as shown in FIG. 6H. In response to detecting the contact on housing 502 at position 602, device 500 sends the item associated with focus selector 604 ("No") as an electronic message to an external device, such as device 600 depicted in FIG. 6I.

In the examples depicted in FIGS. 6A-6H, user interface 606 includes a plurality of text replies displayed in a list format. In other examples, device 500 can display a plurality of items in another group format, such as in a carousel or an array, for example. The displayed plurality of items may include a plurality of text strings, as in user interface 606, or a plurality of images, messages, menus, address book contacts, icons, applications, etc. Thus, the preceding processes described with respect to FIGS. 6A-6H are applicable to navigating any plurality of displayed items and selecting an item.

In the examples depicted in FIGS. 6A-6I, focus selector 604 is an ellipse that encloses an item in the list. In other embodiments, the focus selector may be another form of visual indicator, such as highlighting, outlining, etc. that is associated with one or more of the displayed items.

Figure 6J:
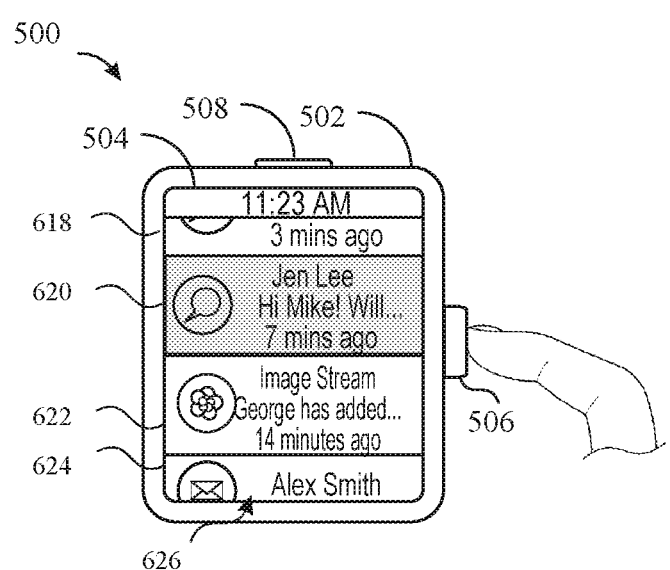
Figure 6K:
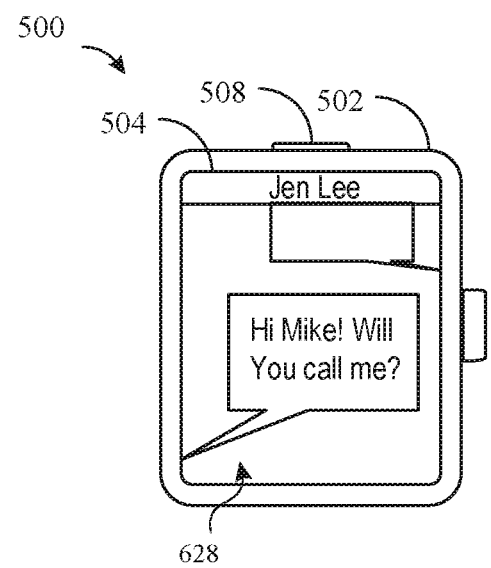

FIGS. 6J-6K illustrate similar processes as described above with respect to FIGS. 6A-6I. In the example of FIG. 6J, device 500 displays a plurality of items in user interface 626, where in this case the plurality of items is a list of notifications 618, 620, 622, 624. In this example, the focus selector is gray highlighting, and the item associated with the focus selector is notification 620. In response to detecting a contact corresponding to rotatable input mechanism 506 that is on rotatable input mechanism 506, device 500 launches an application associated with the highlighted text message, as depicted in FIG. 6K. In this example, the contact is a double-tap on rotatable input mechanism 506 that does not cause mechanical actuation (such as rotation) of rotatable input mechanism 506.

Figure 7:
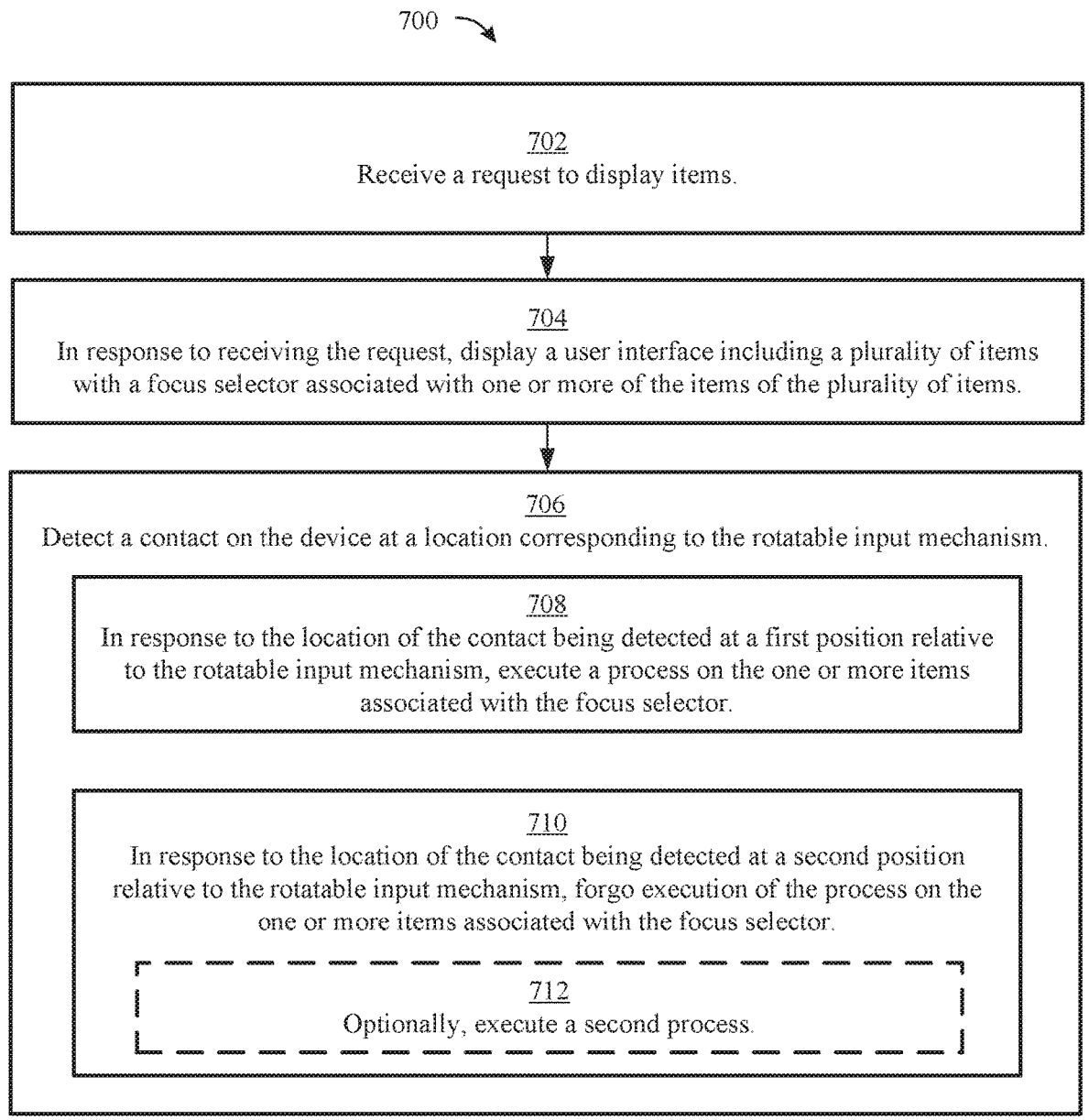
FIGS. 7-9 illustrate flow diagrams of exemplary methods for detecting gestures, navigating lists, and selecting items in accordance with some embodiments.

FIG. 7 is a flow diagram illustrating a process for navigating a list of items and selecting one or more items for processing using a reduced-size electronic device in accordance with some embodiments. Method 700 is performed at a device (e.g., 100, 300, 500) with a display, a housing, and a rotatable input mechanism. Some operations in method 700 are, optionally, combined; the order of some operations is, optionally, changed, and some operations are, optionally, omitted.

As described below, process 700 provides an intuitive way for a user to navigate a list of items (or other plurality of items) and select an item(s) for processing on a reduced-size device. The method reduces the cognitive burden on a user for list navigation and item selection by enabling the user to provide a range of inputs without obscuring the display, thereby creating a more efficient human-machine interface. For battery-operated computing devices, enabling a user to efficiently navigate a list and select an item conserves power and increases the time between battery charges.

At block 702, the device receives a request to display items. The request may be a contact on touch screen 504 (such as the selection of an icon), a contact elsewhere on the device, a movement of the device as detected by an accelerometer, or an activation of a mechanically actuated input mechanism such as a button or rotatable input mechanism, for example.

At block 704, in response to receiving the request, the device displays a user interface that includes a plurality of items with a focus selector associated with one or more of the items of the plurality of items. As described above with respect to FIGS. 6A-6I, the plurality of items may be a list of replies, a list of notifications, an array of images, a group of icons representing applications, a group of menus, etc. The focus selector may be a line enclosing the item(s), as depicted in FIG. 6A, or highlighting around the items, as depicted in FIG. 6J, for example.

At block 706, the device detects a contact on the device at a location corresponding to the rotatable input mechanism. As previously discussed, the contact corresponding to the rotatable input mechanism need not be on the rotatable input mechanism. In some embodiments, the contact is a contact that is off of the display, such as a contact on the housing or on the rotatable input mechanism, as depicted in FIGS. 6A-6I.

At block 708, in response to the location of the contact being detected at a first position relative to the rotatable input mechanism (e.g., on the housing above the rotatable input mechanism as viewed in the device orientation depicted in FIG. 6A, or on the rotatable input mechanism) the device executes a process on the one or more items associated with the focus selector. As previously discussed with respect to FIGS. 6A-6I, this process may include sending the item as an electronic message to an external device, placing the item in a text field, or launching an application associated with the item, for example.

At block 710, in response to the location of the contact being detected at a second position relative to the rotatable input mechanism (e.g., on the housing below the rotatable input mechanism), the device forgoes executing the process on the one or more items associated with the focus selector.

Optionally, at block 712, in response to the location of the contact being detected at the second position, the device executes a second process on the one or more items associated with the focus selector, such as described with respect to FIGS. 6C-D and 6E-F. The second process is distinct from the first process.

Note that details of the processes described above with respect to method 700 (e.g., FIG. 7) are also applicable in an analogous manner to the methods described below. For example, method 800 optionally includes one or more of the characteristics of the various processes described above with reference to method 700. For example, device 500 can combine the ability to respond to contacts on housing 502, as described with respect to FIG. 7, with the ability to respond to a determination that a contact has been removed from the rotatable input mechanism, as described with respect to FIG. 8. For brevity, these details are not repeated below.

Figure 12:
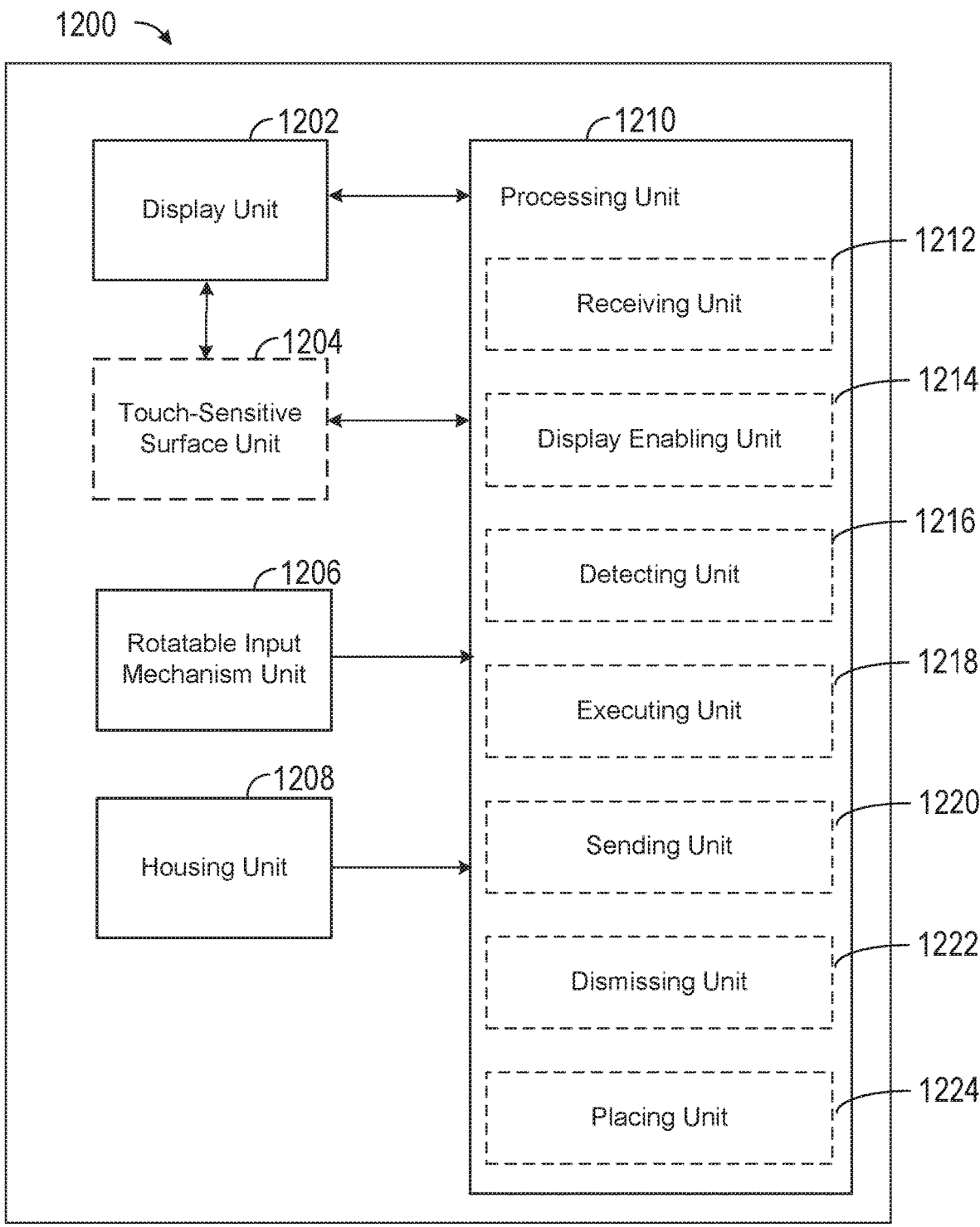
FIGS. 12-16 illustrate functional block diagrams of an electronic device in accordance with some embodiments.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a display unit 1202 configured to display a graphic user interface, optionally, a touch-sensitive surface unit 1204 configured to receive contacts, a rotatable input mechanism unit 1206 configured to receive user inputs; a housing unit 1208 on which contacts may be detected; and a processing unit 1210 coupled to the display unit 1202, rotatable input mechanism unit 1206, housing unit 1208, and, optionally, touch-sensitive surface unit 1204. In some embodiments, the processing unit 1210 includes a receiving unit 1212, a display enabling unit 1214, a detecting unit 1216, an executing unit 1218, a sending unit 1220, a dismissing unit 1222, and a placing unit 1224.

The processing unit 1210 is configured to: receive (e.g., with receiving unit 1212) a request to display items; in response to receiving the request, enable display (e.g., with display enabling unit 1214), on the display unit, of a user interface including a plurality of items with a focus selector associated with one or more items of the plurality of items; detect (e.g., with detecting unit 1216) a contact on the device at a location corresponding to the rotatable input mechanism unit; in response to the location of the contact being detected at a first position relative to the rotatable input mechanism unit, execute (e.g., using executing unit 1218) a process on the one or more items associated with the focus selector; and in response to the location of the contact being detected at a second position relative to the rotatable input mechanism, forgo execution of the process on the one or more items associated with the focus selector, wherein the second position is distinct from the first position.

In some embodiments, the first position is on the housing unit above the rotatable input mechanism unit.

In some embodiments, the first position is on the rotatable input mechanism unit.

In some embodiments, the contact does not activate a mechanically-actuated input mechanism.

In some embodiments, the contact does not include any contact with the display unit.

In some embodiments, the one or more items are one or more text strings.

In some embodiments, the processing unit is further configured to, in response to the location of the contact being detected at the first position relative to the rotable input mechanism, send (e.g., using sending unit 1220) the one or more items associated with the focus selector as an electronic message to an external device, wherein executing the process comprises the sending of the one or more items.

In some embodiments, the processing unit is further configured to, in response to the location of the contact being detected at the first position relative to the rotatable input mechanism unit, dismiss the other items not associated with the focus selector, wherein executing the process includes the dismissing of the other items.

In some embodiments, the processing unit is further configured to, in response to the location of the contact being detected at the first position relative to the rotatable input mechanism unit, place the one or more items in a text field, wherein executing the process includes the placing of the one or more items in the text field.

In some embodiments, the contact is a portion of a gesture that comprises a tap.

In some embodiments, the display unit is a touch-sensitive display unit.

In some embodiments, the device includes one or more sensors configured to detect contacts on the housing.

In some embodiments, the device includes one or more sensors configured to detect contacts on the rotatable input mechanism.

In some embodiments, the one or more sensors include one or more capacitive sensors.

In some embodiments, the processing unit is further configured to: in response to the location of the contact being detected at the second position, execute (e.g., with executing unit 1218) a second process.

In some embodiments, the second process includes displaying a second user interface.

In some embodiments, the second process is executed on the one or more items associated with the focus selector.

In some embodiments, the contact is at a location on the device that is off of the display.

The operations described above with reference to FIG. 7 are, optionally, implemented by components depicted in FIGS. 1A-1B, FIGS. 5A-B, or FIG. 12. For example, receiving operation 702, detecting operation 706, and executing operation 708 are, optionally, implemented by event sorter 170, event recognizer 180, and event handler 190. Event monitor 171 in event sorter 170 detects a contact corresponding to input mechanism 506, and event dispatcher module 174 delivers the event information to application 136-1. A respective event recognizer 180 of application 136-1 compares the event information to respective event definitions 186, and determines whether the contact corresponds to a predefined event or sub event, such as request to execute a process. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 6L:
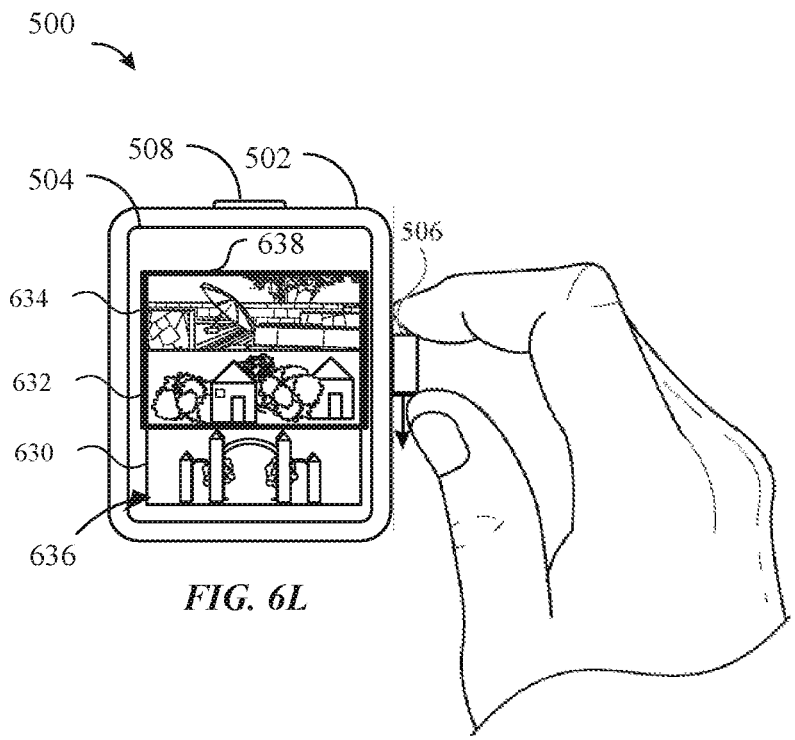
Figure 6M:
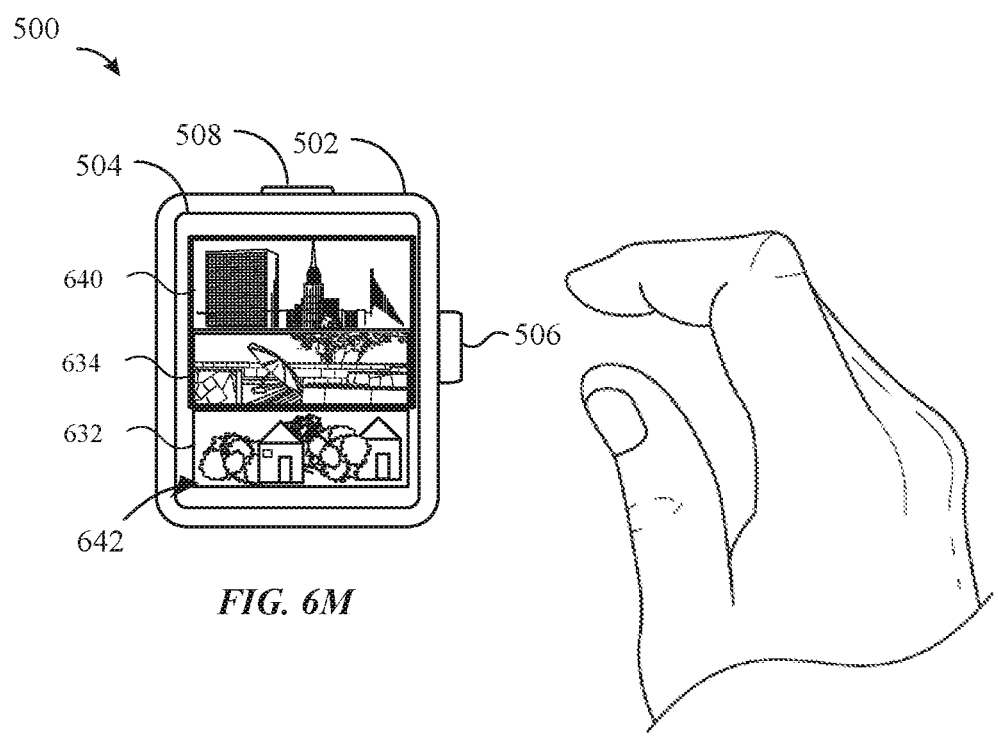
Figure 6N:
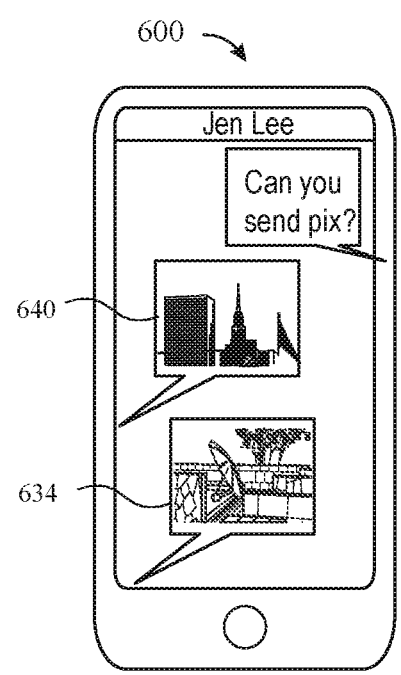

FIGS. 6L-N illustrate processes device 500 can execute in response to detecting user inputs on rotatable input mechanism 506. As will be discussed in more detail below, device 500 can respond differently depending on whether, after detecting a rotation of the rotatable input mechanism, device 500 determines that the user has removed the contact from rotatable input mechanism 506 or not (e.g., whether the user has removed their finger(s) from the rotatable input mechanism after rotating the rotatable input mechanism). The user interfaces depicted in these figures are used to illustrate the processes described below, including the processes in FIG. 8.

FIG. 6L depicts an exemplary user interface 636 that includes a vertical filmstrip of images 630, 632, 634 and a focus selector 638 associated with a two of the images 632, 634. In this example, the focus selector is a thick outline around the images.

In response to detecting a user rotation of rotatable input mechanism 506, device 500 scrolls the images vertically and changes the focus selector to be associated with a second group of images 634, 640 in accordance with the rotation, as depicted in FIG. 6M. In this example, the second group of images includes one of the images (634) that was included in the first group.

The user may rotate rotatable input mechanism 506 by "pinching" rotatable input mechanism 506 between finger and thumb (as depicted in FIG. 6L) and rotating it, or the user may rotate the rotatable input mechanism using a single finger, for example. In both cases, the user makes contact with rotatable input mechanism 506 to rotate it.

In some embodiments, after detecting rotation of the rotatable input mechanism 506 device 500 determines whether the contact has been removed from the rotatable input mechanism 506 while the second group of images 634, 640 is selected; e.g., device 500 determines whether the user has taken their finger(s) off of rotatable input mechanism 506. If device 500 determines that the contact has been removed, device 500 executes a process on the items associated with focus selector 638. In this example, device 500 sends the second group of images 634, 640 as electronic messages to an external electronic device, such as device 600 depicted in FIG. 6N.

In contrast, if device 500 determines that the contact has not been removed from rotatable input mechanism 506 (e.g., the user continues to touch or pinch rotatable input mechanism 506) then device 500 does not send the second group of images. Thus, in some embodiments, in response to determining that the contact has not been removed, device 500 forgoes executing a process on the second group of one or more item(s) associated with focus selector 604.

In some embodiments, in response to determining that the contact has not been removed, device 500 executes a different process, such as returning to a home screen, dismissing the item(s) associated with the focus selector, or opening an application associated with the item(s) associated with the focus selector.

As previously discussed with respect to FIGS. 6A-6K, the above-described processes for navigating a list of items and selecting one or more items for processing can be applied to any type of items, and to items that are displayed in any type of format. While the examples depicted in FIGS. 6L-M focus on selecting and processing a group of two items (e.g., images), in some embodiments, the first group and/or second group can include only one item.

Figure 8:
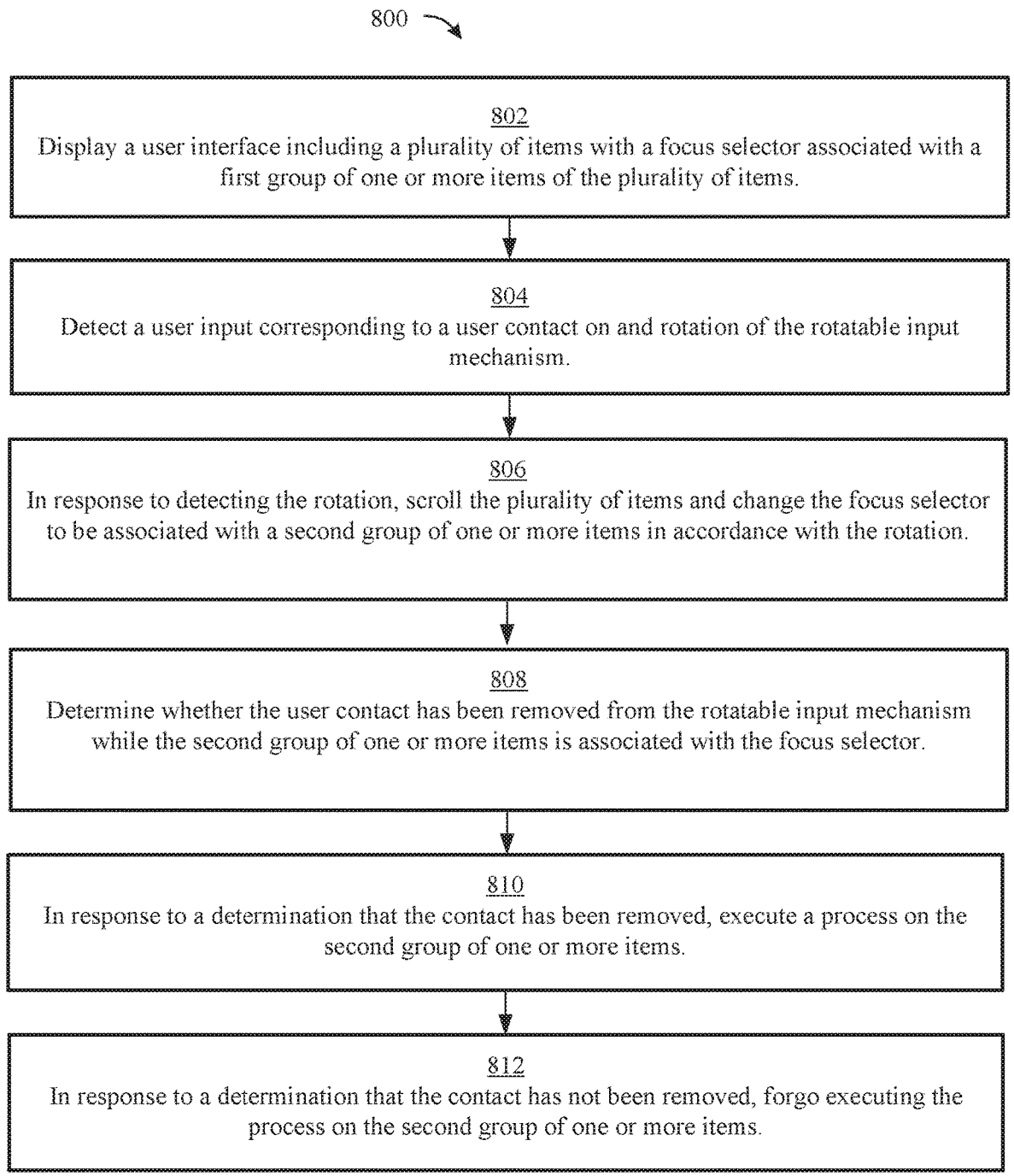

FIG. 8 is a flow diagram illustrating a method for navigating a list and selecting an item using a reduced-size electronic device in accordance with some embodiments. Method 800 is performed at a device (e.g., 100, 300, 500) with a display and a rotatable input mechanism. Some operations in method 800 are, optionally, combined; the order of some operations is, optionally, changed, and some operations are, optionally, omitted.

As described below, method 800 provides an intuitive way for a user to navigate a list (or other plurality of items) and select one or more items for processing. The method reduces the cognitive burden on a user for list navigation and item selection, thereby creating a more efficient human-machine interface. For battery-operated computing devices, enabling a user to navigate a list and select an item more efficiently conserves power and increases the time between battery charges.

At block 802, the device displays a user interface including a plurality of items with a focus selector associated with a first group of one or more items of the plurality of items, such as depicted in FIG. 6L, for example.

At block 804, the device detects a user input corresponding to a rotation of the rotatable input mechanism, which includes a contact with the rotatable input mechanism. In some embodiments, the user input corresponds to a user touching or pinching the rotatable input mechanism and rotating it as described with respect to FIG. 6L, for example.

At block 806, in response to detecting the user input corresponding to the rotation of the rotatable input mechanism, device 500 scrolls the displayed plurality of items and changes the focus selector to be associated with a second group of one or more items in accordance with the rotation, as described with respect to FIG. 6G, for example.

At block 808, the device determines whether the contact has been removed from the rotatable input mechanism while the second group of one or more items is associated with the focus selector.

In response to a determination that the user contact has been removed, at block 810 the device executes a process on the second group of one or more items, as described with respect to FIG. 6M, for example.

In response to a determination that the user contact has not been removed, at block 812 the device forgoes executing the process on the second group of one or more items. In this case, device 500 may not execute any process, or may execute a different process on the second group of one or more items (such as dismissing the items, as described with respect to FIG. 6F), or may execute a different process that is independent of the second group of one or more items (such as returning to a home screen, as described with respect to FIG. 6D).

Note that details of the processes described above with respect to method 800 (e.g., FIG. 8) are also applicable in an analogous manner to the methods described above and below. For example, method 700 optionally includes one or more of the characteristics of the various methods described above with reference to method 800. As previously discussed, for example, device 500 can combine the ability to respond to contacts on housing 502, as described with respect to FIG. 7, with the ability to respond to a determination that a contact has been removed from the rotatable input mechanism, as described with respect to FIG. 8. For brevity, these details are not repeated below.

Figure 13:
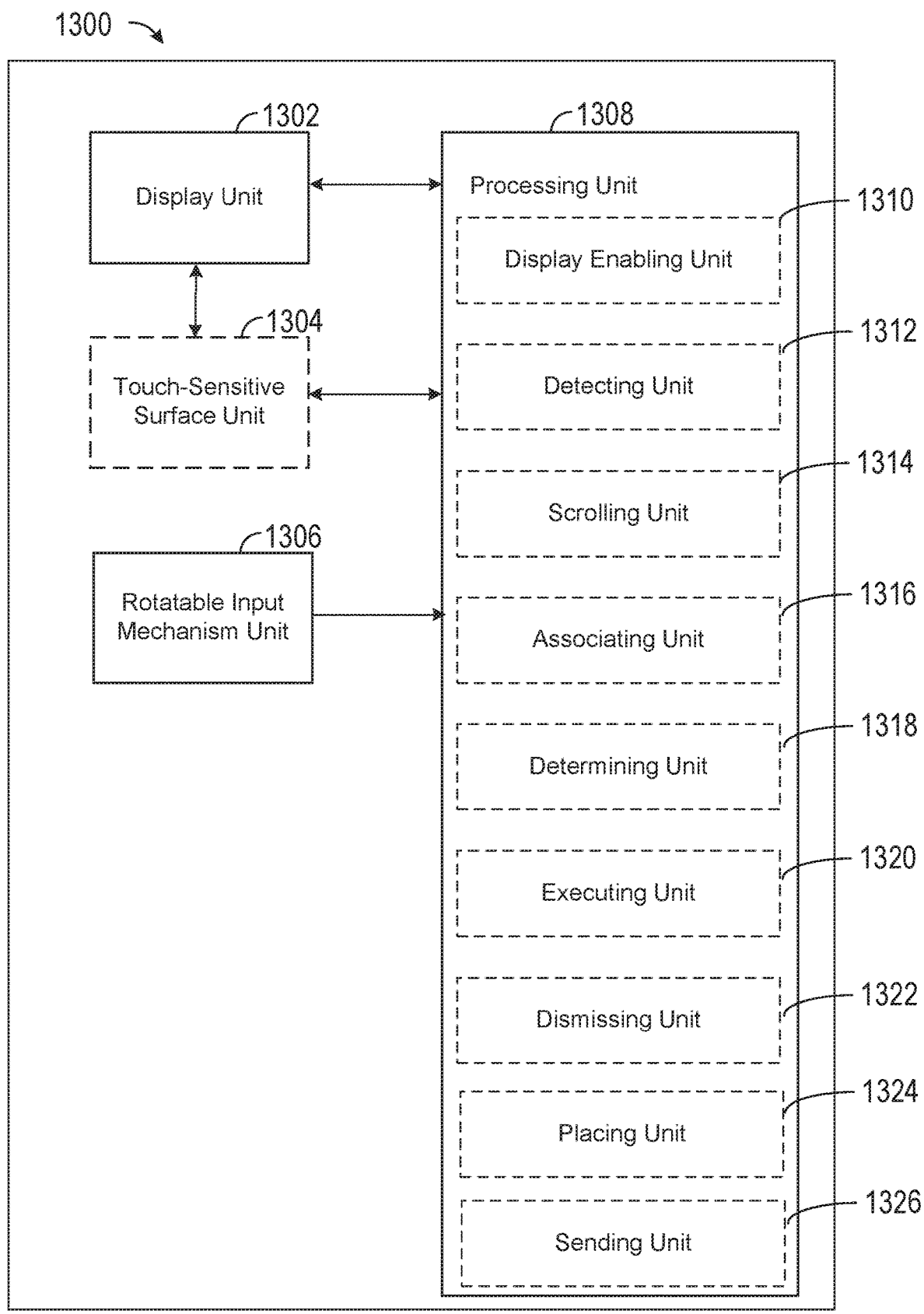

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an electronic device 1300 includes a display unit 1302 configured to display a user interface; optionally, a touch-sensitive surface unit 1304 configured to receive contacts; a rotatable input mechanism unit 1306 configured to receive user inputs; and a processing unit 1308 coupled to the display unit 1302, rotatable input mechanism unit 1306, and, optionally, touch-sensitive surface unit 1304. In some embodiments, the processing unit 1308 includes a display enabling unit 1310, a detecting unit 1312, a scrolling unit 1314, a changing unit 1316, a determining unit 1318, an executing unit 1320, a dismissing unit 1322, a placing unit 1324, and a sending unit 1326.

The processing unit 1308 is configured to: enable display (e.g., using display enabling unit 1310), on display unit 1302, of a user interface including a plurality of items with a focus selector associated with a first group of one or more items of the plurality of items; detect (e.g., using detecting unit 1312) a user input corresponding to a rotation of the rotatable input mechanism unit 1306, where the rotation includes a contact with the rotatable input mechanism unit; in response to detecting the user input corresponding to the rotation, scroll (e.g., using scrolling unit 1314) the plurality of items and associate (e.g., using associating unit 1316) the focus selector with a second group of one or more items in accordance with the rotation; determine (e.g., using determining unit 1318) whether the user contact has been removed from the rotatable input mechanism while the second group of one or more items is associated with the focus selector; in accordance with a determination that the contact has been removed while the second group of one or more items is associated with the focus selector, execute (e.g., using executing unit 1320) a process on the second group of one or more items; and in accordance with a determination that the contact has not been removed while the second item is in focus, forgo execution of the process on the second group of one or more items.

In some embodiments, the processing unit is further configured to, in accordance with the determination that the contact has been removed while the second group of one or more items is associated with the focus selector, dismiss (e.g., using dismissing unit 1322) the items that are not in the second group of one or more items, wherein executing the process includes the dismissing of the items.

In some embodiments, the processing unit is further configured to, in accordance with the determination that the contact has been removed, place (e.g., using placing unit 1324) the second group of one or more items in a text field, wherein executing the process includes the placing of the items in the text field.

In some embodiments, the processing unit is further configured to, in accordance with the determination that the contact has been removed, send (e.g., using sending unit 1326) the second group of one or more items in an electronic message to an external device, wherein executing the process includes the sending of the items.

In some embodiments, the processing unit is further configured to, in accordance with the determination that the contact has not been removed while the second group of one or more items is associated with the focus selector, and while continuing to detect the user input corresponding to rotation of the rotatable input mechanism, scroll (e.g., using scrolling unit 1314) the items to display items that were not previously visible on the display unit, and associate (e.g., using associating unit 1316) the focus selector with a third group of one or more items in accordance with the rotation.

The operations described above with reference to FIG. 8 are, optionally, implemented by components depicted in FIGS. 1A-1B, FIGS. 5A-5B, or FIG. 13. For example, detecting operation 804, determining operation 808, and executing operation 810 are, optionally, implemented by event sorter 170, event recognizer 180, and event handler 190. Event monitor 171 in event sorter 170 detects a user input on rotatable input mechanism 506, and event dispatcher module 174 delivers the event information to application 136-1. A respective event recognizer 180 of application 136-1 compares the event information to respective event definitions 186, and determines whether the user input corresponds to a predefined event or sub event, such as a rotation or a removal of contact from the rotatable input mechanism. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 6O-R illustrate processes device 500 can execute in response to detecting a swipe gesture on device 500 at a location that is off of the display; e.g., a swipe gesture that is on housing 502 or on rotatable input mechanism 506. As previously discussed with respect to FIGS. 6A-6L, in some embodiments, housing 502 and/or rotatable input mechanism 506 can provide touch-sensitive areas on which a user can provide swipe gesture inputs to device 500 without necessarily touching touch screen 504. The user interfaces depicted in these figures are used to illustrate the processes described below, including the processes in FIG. 9.

As will be discussed in more detail below, device 500 can respond to swipe gestures that are off of the display differently depending on the position and/or direction of the swipe gesture relative to rotatable input mechanism 506. For example, device 500 can respond to a swipe gesture in a first direction on the housing above rotatable input mechanism 506 differently than device 500 responds to a swipe gesture in a second (different) direction on the housing above rotatable input mechanism 506.

Figure 6O:
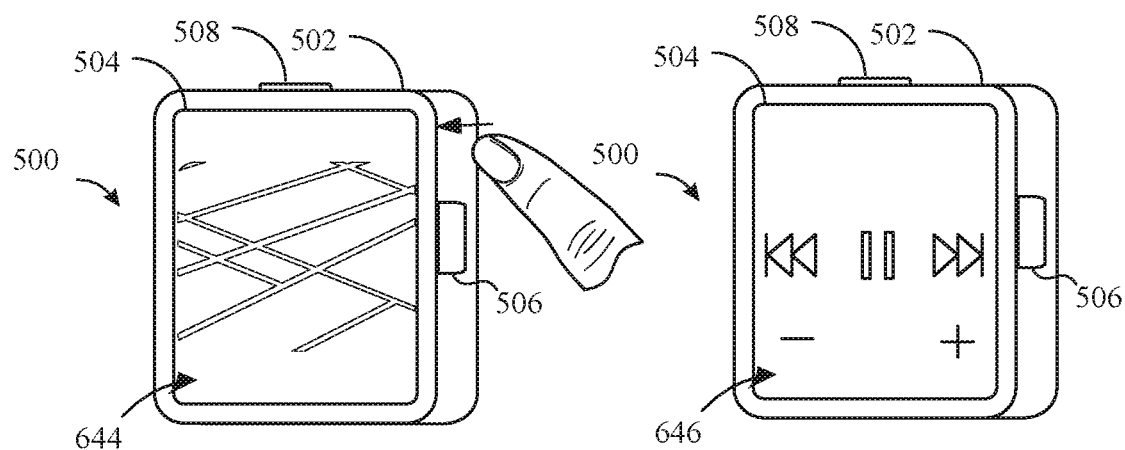

FIG. 6O depicts an exemplary user interface 644 that is, optionally, displayed by device 500. User interface 644 is a map screen associated with a mapping application. In response to detecting a swipe gesture corresponding to rotatable input mechanism 506, device 500 determines the direction of the swipe relative to rotatable input mechanism 506. The swipe gesture corresponding to rotatable input mechanism need not be on rotatable input mechanism 506; it can be on housing 502, for example. In some embodiments, at least a portion of the swipe gesture is not on touch screen 504; e.g., it is off of the display.

In the example depicted in FIG. 6O, the swipe gesture corresponding to rotatable input mechanism 506 is on housing 502 above rotatable input mechanism 506 (as viewed in the device orientation of FIG. 6O). In this example, the direction of the swipe gesture is along an axis perpendicular to the display; e.g., from "back to front" of device 500 on housing 502 of device 500, where the front of device 500 is considered to be the side with touch screen 504.

In some embodiments, back to front directionality can be determined by contact sensor 542; e.g., by comparing the signal strength of the contact as the contact moves perpendicularly towards or away from the display.

In this example, if device 500 determines that the swipe gesture is in the "back to front" direction relative to rotatable input mechanism 506, as depicted in FIG. 6O, device 500 replaces display of user interface 644, the map screen, with display of user interface 646. User interface 646 is an audio control screen with transport control options for controlling audio functions.

In some embodiments, device 500 can replace display of the map user interface screen with display of the audio control user interface screen by discretely replacing one user interface with another, or by smoothly scrolling one user interface off the display while scrolling another user interface onto the display, such that portions of both user interfaces are temporarily displayed at the same time.

Figure 6P:
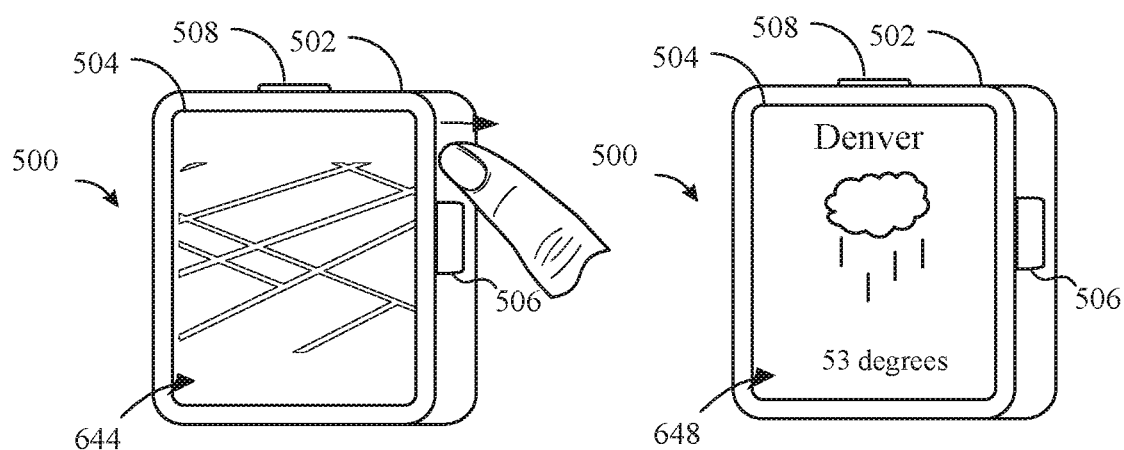

As depicted in FIG. 6P, in some embodiments, if device 500 determines that the swipe gesture corresponding to rotatable input mechanism 506 is in a different (e.g., opposite) direction than the direction described above, such as in a "front to back" direction on housing 504 above rotatable input mechanism 506, then instead of replacing user interface 644 with user interface 646, device 500 replaces display of user interface 644 with a different user interface, user interface 648. User interface 648 is a weather user interface associated with a weather application. Thus, as depicted in FIGS. 6O-P, in some embodiments device 500 enables a user to navigate user interfaces with swipe gestures on housing 502.

In some embodiments, a swipe gesture on housing 502 in a first direction causes device 500 to replace a first user interface with a second user interface, and a subsequent swipe gesture on housing 502 in the opposite direction causes device 500 to replace the second user interface with the first user interface. This type of navigation may be intuitive for users who have previously used swipe gestures on touch screens for navigation, yet provides the significant benefit of not obscuring the touch screen during navigation. Furthermore, by responding to swipe gestures on surfaces other than the touch screen, device 500 can provide a wider range of user inputs and more powerful, flexible user interfaces.

Figure 6Q:
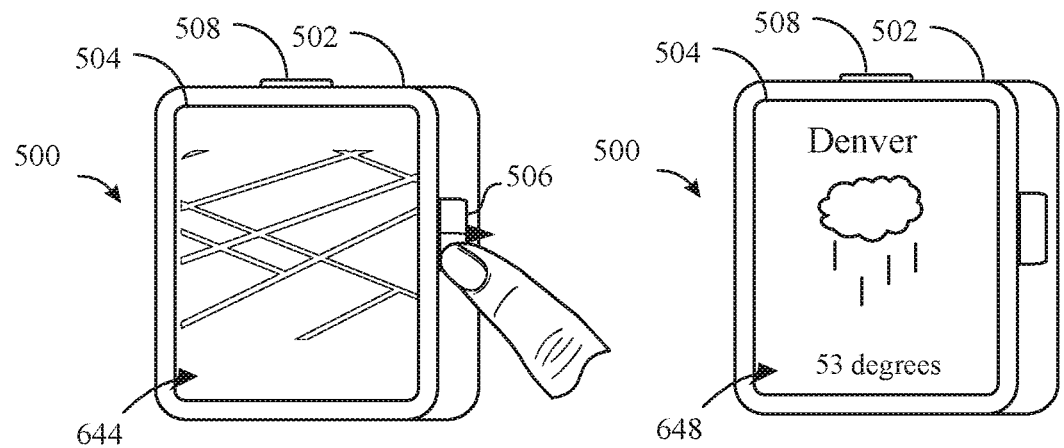
Figure 6R:
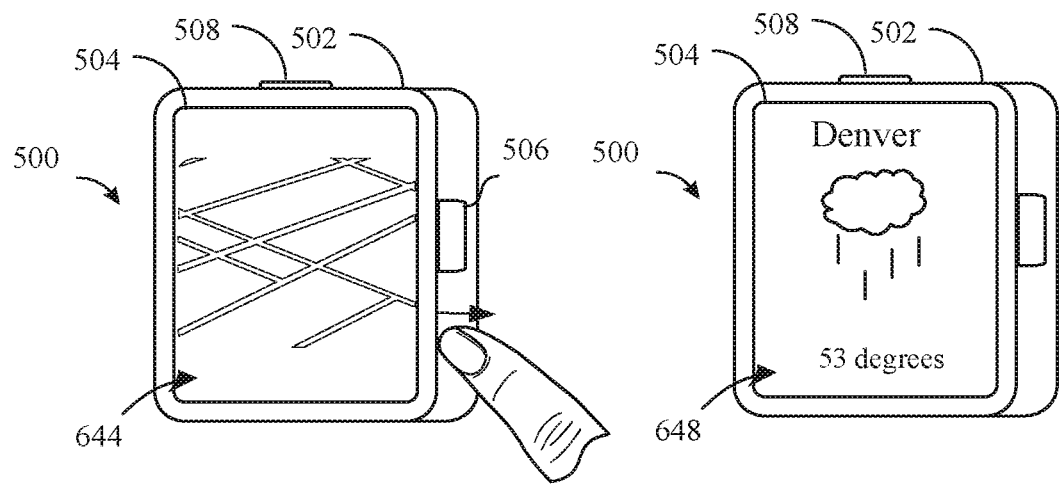

Although the swipe gestures described with respect to FIGS. 6O-P are depicted as being on housing 502 above rotatable input mechanism 506 (e.g., closer to the top of the device than to the bottom of the device, as viewed in the orientation of FIGS. 6O-P), in some embodiments, the swipe gesture may be detected on rotatable input mechanism 506, as depicted in FIG. 6Q, or on housing 502 below rotatable input mechanism 506, as depicted in FIG. 6R. In some embodiments, the orientation (e.g., top and bottom, left and right, and/or front and back) of device 500 is defined by rotatable input mechanism 506 and/or touch screen 504. In some embodiments, device 500 responds differently to swipe gestures above rotatable input mechanism 506 than to swipe gestures below or on rotatable input mechanism 506.

Figure 6S:
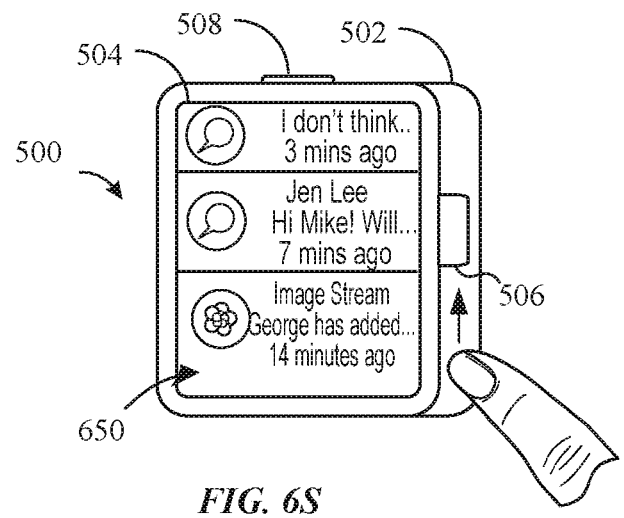

FIG. 6S depicts another example of user interfaces that device 500 can display in response to detecting a swipe gesture on housing 502. Device 500 can display user interface 650, which includes a list of notifications. In the example depicted in FIG. 6S, device 500 detects a swipe gesture on housing 502 below rotatable input mechanism 506. The swipe gesture includes a vertical upward movement of the contact on housing 502, towards rotatable input mechanism 506, in a direction that is perpendicular to a horizontal axis of rotatable input mechanism 506.

Figure 6T:
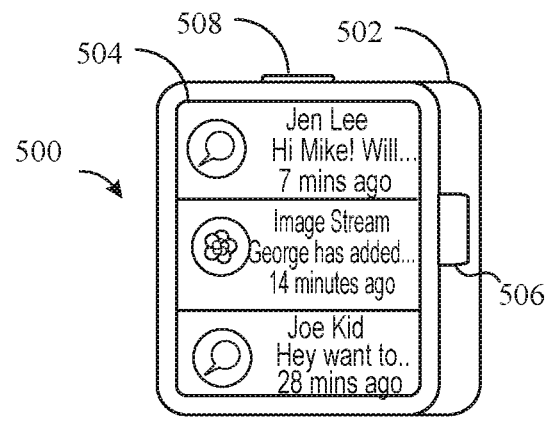

In response to detecting the swipe gesture and determining that the direction is in the vertical direction towards rotatable input mechanism 506, device 500 scrolls user interface 650 to display additional notifications, as depicted in FIG. 6T.

In some embodiments, device 500 can respond differently depending on both the position of the swipe gesture and the direction of the swipe gesture relative to rotatable input mechanism 506. For example, if device 500 detects a swipe gesture on housing 502 above rotatable input mechanism 506, in a vertical downward direction (e.g., in a direction opposite to the direction shown in FIG. 6S), device 500 can scroll user interface 650 in the opposite direction.

Figure 9:
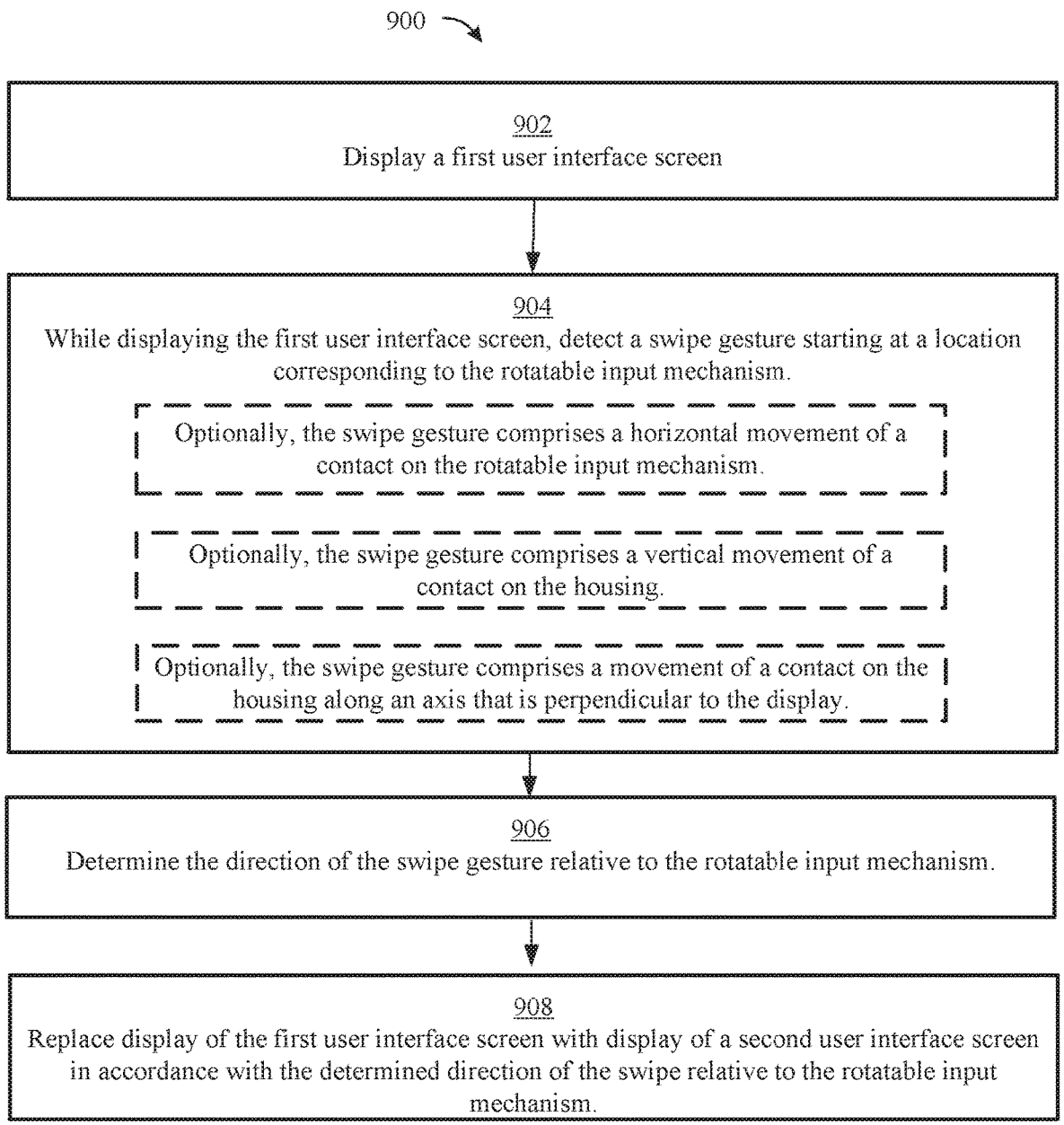

FIG. 9 is a flow diagram illustrating a method for navigating user interface screens using a reduced-size electronic device in accordance with some embodiments. Method 900 is performed at a device (e.g., 100, 300, 500) with a display and a rotatable input mechanism. Some operations in method 900 are, optionally, combined, the order of some operations is, optionally, changed, and some operations are, optionally, omitted.

As described below, method 900 provides an intuitive way for a user to navigate user interface screens without obscuring the display by detecting swipe gestures off of the display; e.g., on the housing or on the rotatable input mechanism. The method reduces the cognitive burden on a user for navigating user interface screens, thereby creating a more efficient human-machine interface. For battery-operated computing devices, enabling a user to navigate user interface screens and documents more efficiently conserves power and increases the time between battery charges.

At block 902, the device displays a first user interface. The first user interface may be an interface associated with a particular application as depicted in FIGS. 6O-R, for example, or a portion of an electronic document.

While displaying the first user interface, at block 904 the device detects a swipe gesture starting at a location corresponding to the rotatable input mechanism. In some embodiments, the location corresponding to the rotatable input mechanism is a location off of the display, such as on the housing of the device (as depicted in FIGS. 6O, 6P, and 6R) or on the rotatable input mechanism (as depicted in FIG. 6Q).

Optionally, the swipe gesture includes a horizontal movement of a contact on the rotatable input mechanism, such as depicted in FIG. 6Q.

Optionally, the swipe gesture includes a vertical movement of a contact on the housing, such as depicted in FIG. 6S.

Optionally, the swipe gesture includes a movement of a contact on the housing along an axis that is perpendicular to the display, such as depicted in FIG. 6R.

At block 906, the device determines the direction of the swipe gesture relative to the rotatable input mechanism. In some embodiments, the device determines the direction of the swipe gesture using contact sensor 542, for example.

At block 908, the device replaces display of the first user interface with display of a second user interface in accordance with the direction of the swipe gesture as determined at block 906. In some embodiments, the device replaces display of the first user interface screen with display of the second user interface screen as described with respect to FIGS. 6O-R.

Note that details of the processes described above with respect to method 900 (e.g., FIG. 9) are also applicable in an analogous manner to the methods described above and below. For example, method 800 optionally includes one or more of the characteristics of the various processes described above with reference to method 900. For example, device 500 can respond to swipe gestures starting at a location corresponding to the rotatable input mechanism as described above with respect to method 900, and respond to a user input corresponding to a rotation of rotatable input mechanism 506 as described with respect to method 800. For brevity, these details are not repeated.

Figure 14:
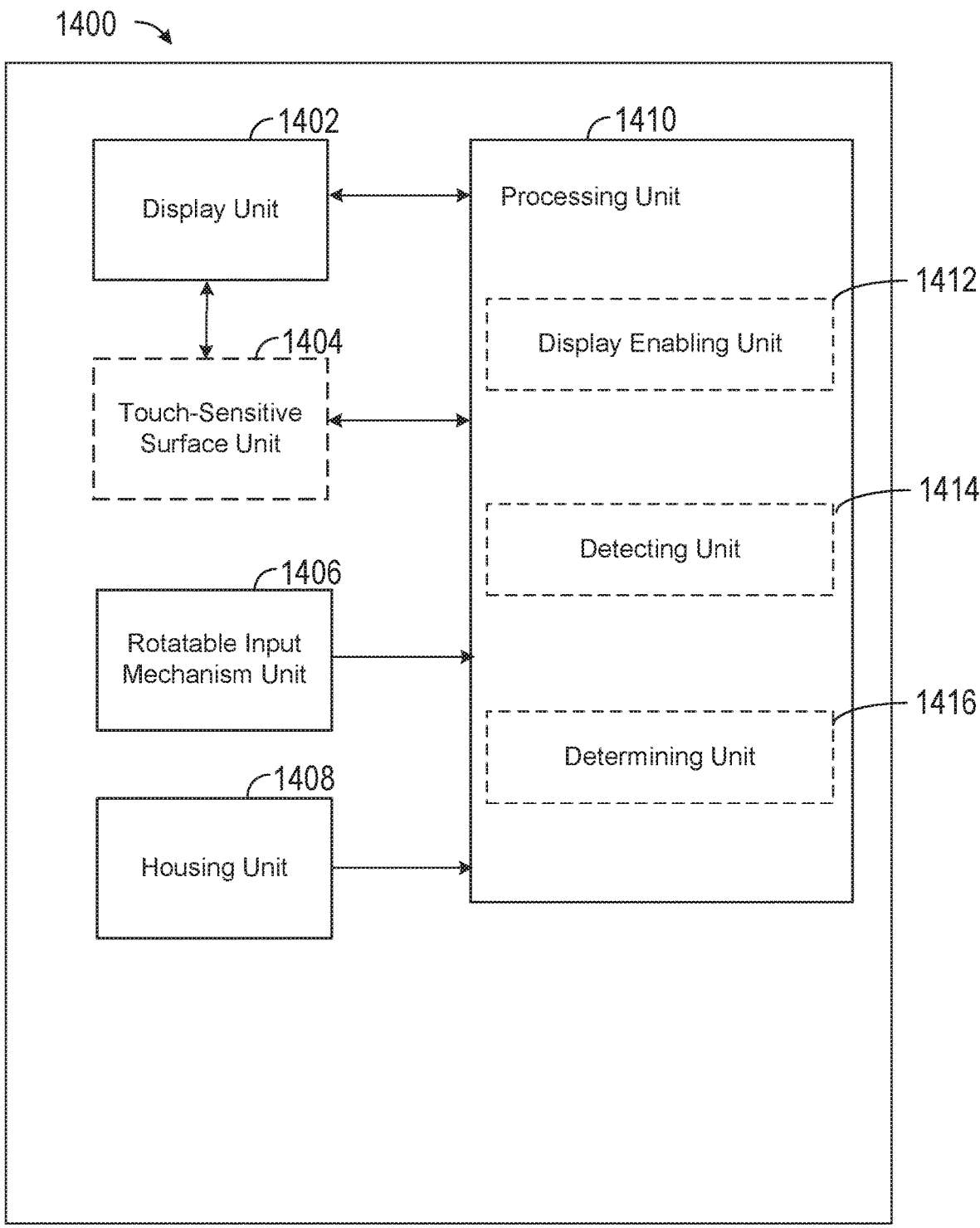

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display user interfaces, optionally, a touch-sensitive surface unit 1404 configured to receive contacts, a rotatable input mechanism unit 1406 configured to receive user inputs, a housing unit 1408 on which contacts may be detected, and a processing unit 1410 coupled to the display unit 1402, rotatable input mechanism unit 1406, and, optionally, the touch-sensitive surface unit 1404 and housing unit 1408. In some embodiments, the processing unit 1410 includes a display enabling unit 1412, a detecting unit 1414, a determining unit 1416, and an executing unit 1418.

The processing unit 1410 is configured to: enable display (e.g., using display enabling unit 1412), on the display unit, of a first user interface screen; while displaying the first user interface screen on the display unit, detect (e.g., using detecting unit 1414) a swipe gesture starting at a location corresponding to the rotatable input mechanism unit; determine (e.g., using determining unit 1416) the direction of the swipe relative to the rotatable input mechanism; and enable replacement of the display of the first user interface screen with display, on the display unit, of a second user interface screen in accordance with the determined direction of the swipe gesture relative to the rotatable input mechanism.

In some embodiments, the swipe gesture comprises a horizontal movement of a contact on the rotatable input mechanism unit.

In some embodiments, the swipe gesture comprises a vertical movement of a contact on the housing unit.

In some embodiments, the swipe gesture comprises a movement of a contact on the housing unit along an axis that is perpendicular to the display unit.

In some embodiments, the location of the swipe is above the rotatable input mechanism unit.

In some embodiments, the swipe gesture is a first swipe gesture, and the processing unit is further configured to: detect (e.g., using detecting unit 1414) a second swipe gesture starting at a location corresponding to the rotatable input mechanism and in the opposite direction of the first swipe gesture; and replace display (e.g., using display enabling unit 1412), on the display unit, of the second user interface screen with display, on the display unit, of the first user interface screen.

In some embodiments, at least a portion of the swipe gesture is detected at a location on the device that is off of the display unit.

The operations described above with reference to FIG. 9 are, optionally, implemented by components depicted in FIGS. 1A-1B, FIGS. 5A-5B, or FIG. 14. For example, detecting operation 904, determining operation 906, and replacing operation 908 are, optionally, implemented by event sorter 170, event recognizer 180, and event handler 190. Event monitor 171 in event sorter 170 detects a swipe gesture corresponding to rotatable input mechanism 506, and event dispatcher module 174 delivers the event information to application 136-1. A respective event recognizer 180 of application 136-1 compares the event information to respective event definitions 186, and determines whether the direction of the swipe gesture corresponds to a predefined event or sub event, such as a request to replace display of a first user interface screen with display of a second user interface screen. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 6U:
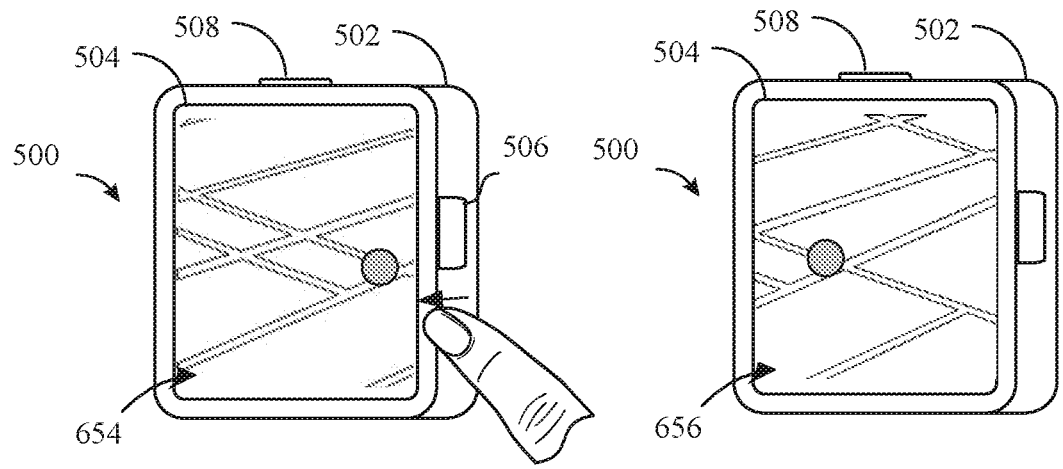
Figure 6V:
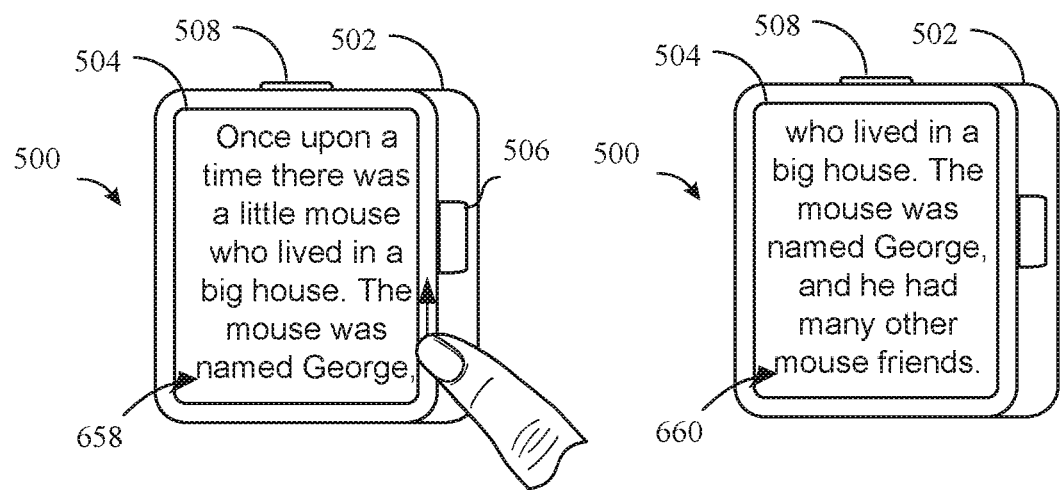

FIGS. 6U-V illustrate processes device 500 can execute in response to detecting a swipe gesture off of the display while displaying an electronic document. As will be discussed in more detail below, device 500 can respond to swipe gestures that are off of the display by translating the display of an electronic document in accordance with the direction and/or location of the swipe gesture relative to the rotatable input mechanism 506. The user interfaces depicted in these figures are used to illustrate the processes described below, including the processes in FIG. 10.

As previously discussed with respect to FIGS. 6A-6T, in some embodiments, housing 502 and/or rotatable input mechanism 506 can provide touch-sensitive areas on which a user can provide swipe gesture inputs to device 500 without necessarily touching touch screen 504.

FIG. 6U depicts an exemplary user interface 654 that is, optionally, displayed by device 500. User interface 654 is a map associated with a mapping application. In response to detecting a swipe gesture corresponding to rotatable input mechanism 506, device 500 determines the direction of the swipe relative to rotatable input mechanism 506.

As previously discussed, the swipe gesture corresponding to rotatable input mechanism need not be on rotatable input mechanism 506; it can be on housing 502, for example. In some embodiments, at least a portion of the swipe gesture is not on touch screen 504; e.g., it is off of the display.

As depicted in FIG. 6U, in response to determining the direction of the swipe gesture relative to the rotatable input mechanism 506, device 500 translates the display of the map in accordance with the determined direction of the swipe gesture. For example, device 500 can translate (e.g., shift or pan) the map up or down, left or right depending on the direction of the swipe gesture, to display portions of the map that were not previously displayed. In this example, the swipe gesture is from left to right on the housing 502 (note here that housing 502 includes the bezel of device 500), and the map is translated on the display from left to right. In this manner, device 500 allows a user to translate (e.g., shift or pan) the display of an electronic document without requiring the user to touch the display and obscure a portion of the content.

FIG. 6V depicts another exemplary user interface that is, optionally, displayed by device 500. In this example, device 500 displays user interface 658 that includes a document that contains text. In response to detecting a swipe gesture on housing 506 and determining that the swipe gesture is in the vertical direction relative to rotatable input mechanism 506, device 500 translates the display of the text document vertically upward.

While the above examples describe translating the display of a map or text document, a person of skill will recognize that the above-described techniques can be used to translate the display of any kind of electronic document or screen, including images, web pages, lists, menus, etc.

FIG. 10 is a flow diagram illustrating a method for translating the display of an electronic document using a reduced-size electronic device in accordance with some embodiments. Method 1000 is performed at a device (e.g., 100, 300, 500) with a display and a rotatable input mechanism. Some operations in method 1000 are, optionally, combined, the order of some operations is, optionally, changed, and some operations are, optionally, omitted.

As described below, method 1000 provides an intuitive way for a user to translate (e.g., shift or pan) the display of an electronic document. The method reduces the cognitive burden on a user for document navigation, thereby creating a more efficient human-machine interface. For battery-operated computing devices, enabling a user to translate the display of an electronic document more efficiently conserves power and increases the time between battery charges.

At block 1002, the device displays a portion of an electronic document. The electronic document may be a map, an image, a list of items, a text document, a web page, etc., as described with respect to FIGS. 6U-V.

At block 1003, while displaying the portion of the electronic document, the device detects a swipe gesture starting at a location corresponding to the rotatable input mechanism. The location may be on the housing or on the rotatable input mechanism, for example, as described with respect to FIGS. 6U-V.

Optionally, the swipe gesture includes a horizontal movement of a contact on the rotatable input mechanism, as depicted with respect to FIG. 6Q.

Optionally, the swipe gesture includes a vertical movement of a contact on the housing, as depicted with respect to FIG. 6V.

Optionally, the swipe gesture includes a movement of a contact on the housing along an axis that is substantially perpendicular to the display, as depicted with respect to FIG. 6R.

At block 1006, the device determines the direction of the swipe gesture relative to the rotatable input mechanism.

At block 1008, the device translates the display of the electronic document in accordance with the determined direction of the swipe gesture. In FIG. 6U, for example, the device determines that the swipe gesture is from left-to-right on the housing, and translates the display of the electronic document accordingly, from left-to-right on the display.

Note that details of the processes described above with respect to method 1000 (e.g., FIG. 10) are also applicable in an analogous manner to the methods described above and below. For example, method 900 optionally includes one or more of the characteristics of the various processes described above with reference to method 1000. For example, device 500 can, in some embodiments, provide list navigation and item selection functionality as described with respect to FIGS. 7 and 8 to allow a user to select and open an electronic document, then translate the display of the electronic document in response to detecting swipe gestures as described with respect to FIG. 9. For brevity, these details are not repeated.

Figure 15:
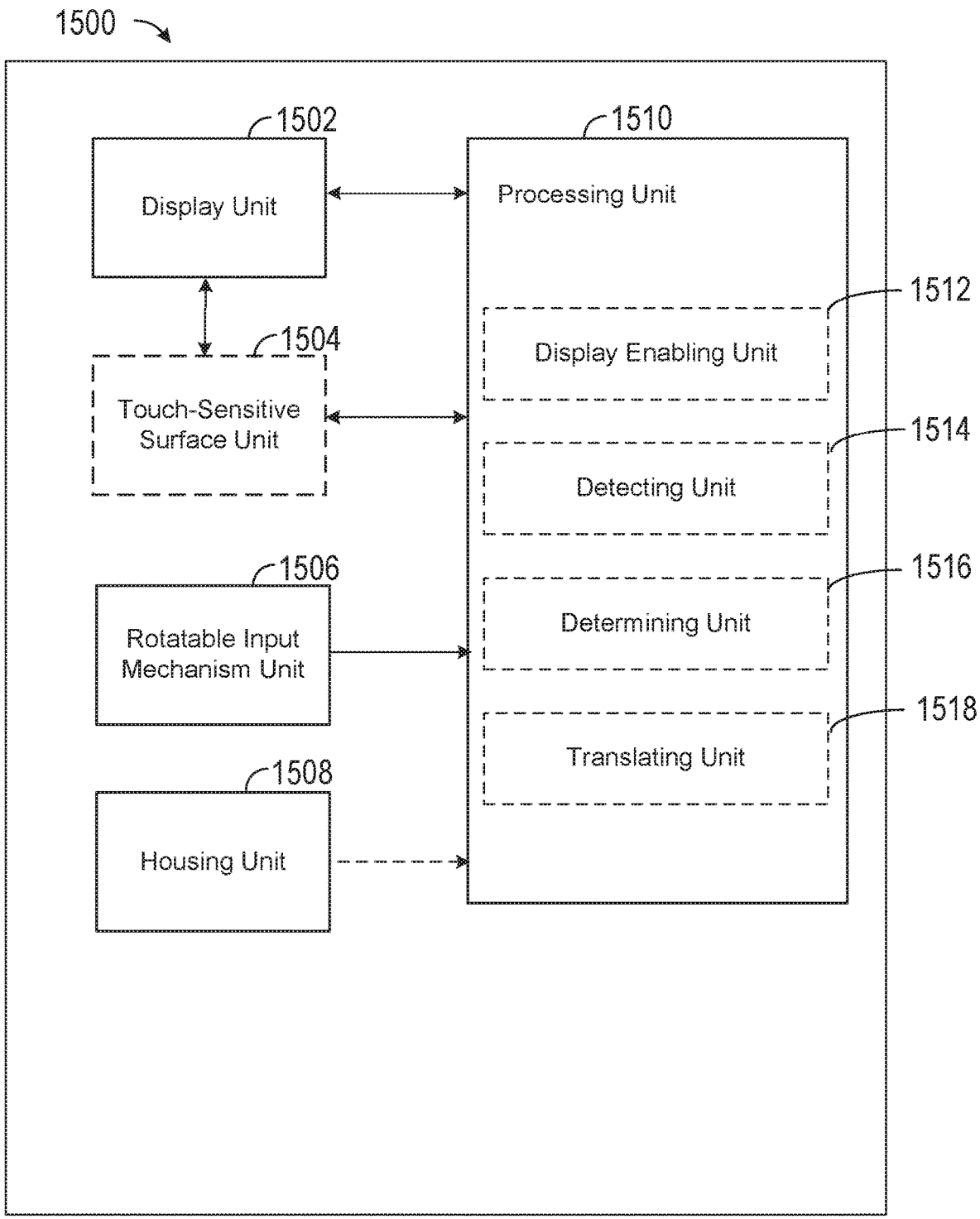

In accordance with some embodiments, FIG. 15 shows an exemplary functional block diagram of an electronic device 1500 configured in accordance with the principles of the various described embodiments. In accordance with some embodiments, the functional blocks of electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an electronic device 1500 includes a display unit 1502 configured to display user interfaces, optionally, a touch-sensitive surface unit 1504 configured to receive contacts, a rotatable input mechanism unit 1506 configured to receive user inputs, a housing unit 1508 on which contacts may be detected, and a processing unit 1510 coupled to the display unit 1502, rotatable input mechanism unit 1506, and, optionally, the touch-sensitive surface unit 1504 and housing unit 1508. In some embodiments, the processing unit 1510 includes a display enabling unit 1512, a detecting unit 1514, a determining unit 1516, and a translating unit 1518.

The processing unit 1510 is configured to: enable display (e.g., using display enabling unit 1512), on the display unit, of a portion of an electronic document; detect (e.g., using detecting unit 1514) a swipe gesture on the device at a location corresponding to the rotatable input mechanism unit; determine (e.g., using determining unit 1516) the direction of the swipe gesture relative to the rotatable input mechanism unit; and translate (e.g., using translating unit 1518) the display, on the display unit, of the document in accordance with the determined direction of the swipe gesture.

In some embodiments, translating the document comprises displaying a second portion of the document that is different from the first portion.

In some embodiments, at least a portion of the swipe gesture is on the housing.

In some embodiments, at least a portion of the swipe gesture is detected at a location on the device that is off of the display.

The operations described above with reference to FIG. 10 are, optionally, implemented by components depicted in FIGS. 1A-1B, FIGS. 5A-5B, or FIG. 15. For example, detecting operation 1004 and determining operation 1006, are, optionally, implemented by event sorter 170, event recognizer 180, and event handler 190. Event monitor 171 in event sorter 170 detects a swipe gesture corresponding to rotatable input mechanism 506, and event dispatcher module 174 delivers the event information to application 136-1. A respective event recognizer 180 of application 136-1 compares the event information to respective event definitions 186, and determines whether the swipe gesture corresponds to a predefined event or sub event, such as a request to translate a document. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 6X illustrates processes device 500 can execute in response to detecting a contact on device 500 at a location that is off of the display; e.g., a tap or swipe gesture that is on housing 502 or on rotatable input mechanism 506. The user interface depicted in FIG. 6X is used to illustrate the processes described below, including the processes in FIG. 11.

In some embodiments, device 500 can operate in an audio control mode. In some embodiments, the audio control mode is associated with a user interface for receiving user inputs associated with controlling audio functions. Such audio functions can include changing a volume at which the audio content is played, for example. Such audio functions can include changing the track or playlist of audio content being played, for example. Such audio functions can include starting, stopping, pausing, fast-forwarding, or rewinding an audio recording, for example. A person of skill in the art will appreciate that there are other audio functions that could be controlled using the disclosed techniques, and that the disclosed techniques may also be applied to controlling other multimedia functions, such as video functions.

In some embodiments, while device 500 is operating in an audio control mode and the display is inactive, device 500 can respond to contacts off of the display by sending audio control data associated with an audio function to an external audio device, without activating the display. For example, device 500 can enable a user to control the audio functions of an external audio device (such as a wireless headset or earbuds) from device 500 without activating the display on device 500, thus reducing battery usage.

In some embodiments, the user interface associated with the audio control mode can be active when the display is off or dark.

In some embodiments, the user interface associated with the audio control mode can be active when the display is displaying a user interface for a different application, such as a mapping application. Thus, in some embodiments, the user interface associated with the audio control mode does not require the use of the display.

In some embodiments, device 500 can enter the audio control mode in response to detecting a user input such as a contact on touchscreen 502, a contact on housing 506, or a contact on rotatable input mechanism 506, for example. In some embodiments, device 500 can enter the audio control mode in response to detecting a user input such as a mechanical actuation (e.g., a rotation or depression) of rotatable input mechanism 506 or button 508, for example. In some embodiments, device 500 can enter the audio control mode automatically after launching an audio application.

Figure 6W:
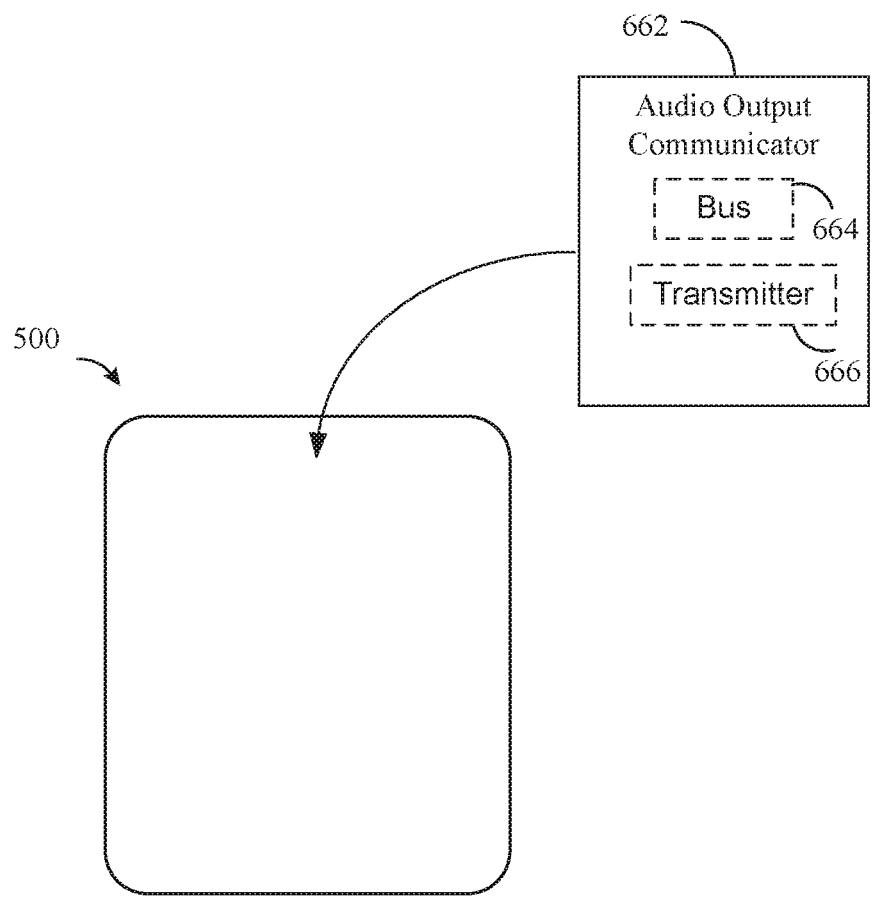
Figure 6X:
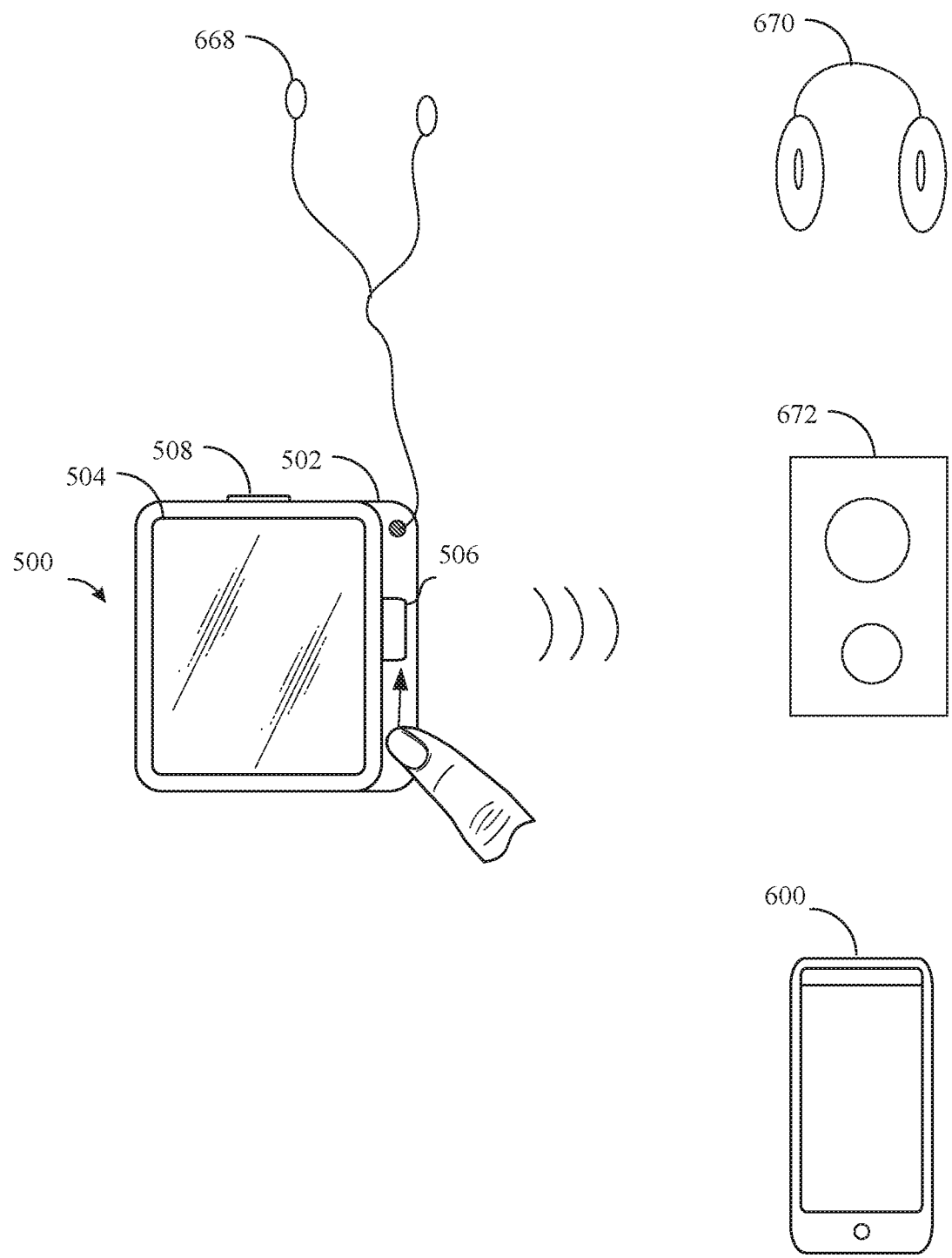

To enable device 500 to communicate with an external audio device, in some embodiments, as depicted in FIG. 6W, device 500 includes an audio output communicator 662, such as a bus 664 or transmitter 666, that is in communication with the external audio device. For example, the audio output communicator may include a bus that is in communication with wired earbuds. The audio output communicator may include a transmitter that is in wireless communication with a wireless headset, for example.

In some embodiments, while device 500 is operating in the audio control mode and touch screen 502 is inactive or dark, device 500 can detect and respond to contacts off of touch screen 502 without activating or turning on touch screen 502. In some embodiments, while device 500 is operating in the audio control mode, if device 500 detects a contact at a location corresponding to rotatable input mechanism 506 (e.g., on housing 504 or on the rotatable input mechanism 506), device 500 provides audio control data associated with an audio function to the audio output communicator 662. Device 500 can provide the audio control data to the audio output communicator by providing audio control data to bus 664 or transmitter 666, for example.

FIG. 6X depicts an example of device 500 operating in an audio control mode with touch screen 504 inactive or dark. In response to detecting a swipe gesture on housing 502 below rotatable input mechanism 506, where the swipe gesture includes a movement towards rotatable input mechanism 506, device 500 provides audio control data to audio output communicator 662. Audio output communicator 662, in turn, sends the audio control data to an external audio device such as wired earbuds 668, wireless headset 670, speaker 672, or portable multifunction device 600 to control the audio functions of these external audio devices. For example, if device 500 detects an upward swipe on housing 506, device 500 can respond by providing audio control data to audio output communicator that causes wireless headset 608 to increase the volume at which wireless headset 608 is playing audio content.

In some embodiments, the contact corresponding to the rotatable input mechanism 506 does not activate touch screen 502; e.g., the contact is on housing 502 or rotatable input mechanism 506 and does not cause touch screen 502 to be turned on or actively display content.

In some embodiments, if touch screen 502 is displaying a user interface associated with another application, the contact corresponding to the rotatable input mechanism 506 does not cause touch screen 502 to display different content.

In some embodiments, device 500 can provide different audio control data to the audio output communicator depending on the location of the contact relative to the rotatable input mechanism. For example, in response to detecting the contact at a first position relative to the rotatable input mechanism (e.g., on the housing below the rotatable input mechanism), device 500 can send audio control data associated with the audio function of decreasing the audio volume. In response to detecting the contact at a second (different) position relative to the rotatable input mechanism (e.g., on the housing above the rotatable input mechanism), device 500 can send audio control data associated with the audio function of increasing the audio volume at which audio content is being played. Thus, in some embodiments, the audio control data is based on the location of the contact relative to the rotatable input mechanism 506.

In some embodiments, device 500 can provide different audio control data to the audio output communicator depending on the direction of movement of the contact. For example, in response to detecting an upward swipe on housing 502 towards rotatable input mechanism 506 (as depicted in FIG. 6W), device 500 can provide audio control data associated with the audio function of switching to the next track in a playlist. In response to detecting a downward swipe on housing 502 below rotatable input mechanism 506, device 500 can provide audio control data associated with the audio function of switching to the previous track in a playlist. Thus, in some embodiments, the audio control data is based on the direction of the movement of the contact relative to the rotatable input mechanism 506 (e.g., the direction of a swipe gesture).

In some embodiments, the contact does not activate a mechanically-actuated input, such as a button 508 or rotatable input mechanism 506. E.g., the contact does not cause a depression of button 508 or rotation of rotatable input mechanism 506.

In some embodiments, if device 500 detects a contact with touch screen 504 while in the audio control mode, device 500 activates touch screen 504 by, for example, turning the screen on or displaying a user interface.

In some embodiments, device 500 can provide audio control data to the audio output communicator in response to detecting a rotation of rotatable input mechanism 506. For example, in response to detecting a rotation of rotatable input mechanism 506 in a first direction, device 500 can provide audio control data associated with increasing the volume of audio content. In response to detecting a rotation of rotatable input mechanism 506 in the opposite direction, device 500 can provide audio control data associated with the audio function of decreasing the volume of audio content. Similarly, in some embodiments, device 500 can provide audio control data associated with the audio function of switching tracks or switching playlists in response to detecting a rotation of rotatable input mechanism 506. Thus, in some embodiments, the user can control an external audio device by tapping or swiping the housing of device 500, by tapping or swiping the rotatable input mechanism, and/or by rotating the rotatable input mechanism—none of which necessarily require the display to be activated.

FIG. 11 is a flow diagram illustrating a method for controlling audio functions of an external device using a reduced-size electronic device in accordance with some embodiments. Method 1100 is performed at a device (e.g., 100, 300, 500) with a display and a rotatable input mechanism. Some operations in method 1100 are, optionally, combined, the order of some operations is, optionally, changed, and some operations are, optionally, omitted.

As described below, method 1100 provides an intuitive way for a user to control audio functions of an external audio device without activating the display. The method reduces the cognitive burden on a user for audio control, thereby creating a more efficient human-machine interface. For battery-operated computing devices, enabling a user to control audio functions without activating the display conserves power and increases the time between battery charges.

At block 1102, while the display is inactive and the device is operating in an audio control mode, the device detects a contact on the device at a location corresponding to the rotatable input mechanism, where the contact does not cause the device to activate the display. In some embodiments, the contact is on the housing, as depicted in FIG. 6X. In some embodiments, the contact is on the rotatable input mechanism.

At block 1104, in response to the location of the contact being detected at a first position relative to the rotatable input mechanism, the device provides first audio control data to the audio output communicator, where the first audio control data is associated with an audio function. In some embodiments, the device provides the first audio control data to the audio output communicator by providing the audio control data to a bus or transmitter, as described with respect to FIG. 6W.

Optionally, the first audio control data is associated with changing a volume at which audio content is played.

Optionally, the first audio control data is associated with changing the audio content being played.

Optionally, at block 1106, in response to the location of the contact being detected at a second position relative to the rotatable input mechanism, the device forgoes providing the first audio data to the audio output communicator.

Optionally, at block 1106, in response to the location of the contact being detected at the second position, the audio control data is associated with a second audio function.

Note that details of the processes described above with respect to method 1100 (e.g., FIG. 11) are also applicable in an analogous manner to the methods described above. For example, method 1000 optionally includes one or more of the characteristics of the various methods described above with reference to method 1100. For example, when the display is active and device 500 is not in an audio control mode, device 500 can translate display of a document as described with respect to method 1000. When the display is inactive and device 500 has been placed into an audio control mode, device 500 can provide audio control functionality as described above with respect to FIG. 11. For brevity, these details are not repeated.

Figure 16:
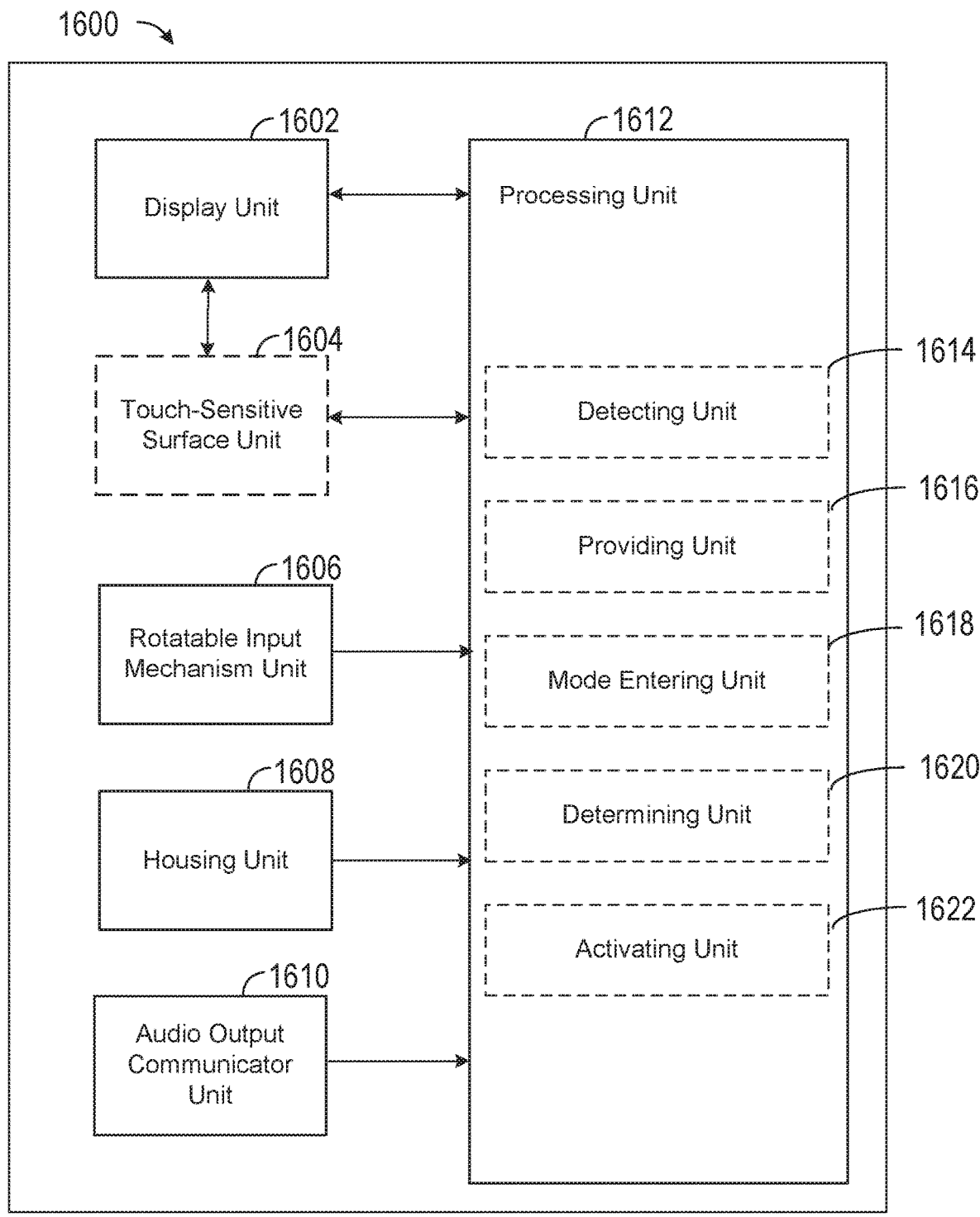

In accordance with some embodiments, FIG. 16 shows an exemplary functional block diagram of an electronic device 1600 configured in accordance with the principles of the various described embodiments. In accordance with some embodiments, the functional blocks of electronic device 1600 are configured to perform the techniques described above. The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

As shown in FIG. 16, an electronic device 1600 includes a display unit 1602 configured to display graphic user interfaces, optionally, a touch-sensitive surface unit 1604 configured to receive contacts, a rotatable input mechanism unit 1604 configured to receive user inputs, a housing unit 1604 on which contacts may be detected, an audio output unit 1604 configured to provide audio control data to external audio devices, and a processing unit 1612 coupled to the display unit 1602, rotatable input mechanism unit 1606, housing unit 1608, and audio output unit 1610, and, optionally, touch-sensitive surface unit 1604. In some embodiments, the processing unit 1612 includes a detecting unit 1614, a providing unit 1616, a mode entering unit 1618, a determining unit 1620, and an activating unit 1622.

The processing unit 1612 is configured to: while the display unit is inactive and while the device is operating in an audio control mode, detect (e.g., using detecting unit 1614) a contact on the device at a location corresponding to the rotatable input mechanism unit, wherein the contact does not cause the device to activate the display unit; and in response to the location of the contact being detected at a first position relative to the rotatable input mechanism, provide (e.g., using providing unit 1616) first audio control data to the audio output unit, wherein the first audio control data is associated with an audio function.

In some embodiments, the processing unit is further configured to, in response to the location of the second contact being detected at a second position relative to the rotatable input mechanism, forgo providing the first audio control data to the audio output communicator.

In some embodiments, the processing unit is further configured to, further in response to the location being detected at the second position, provide (e.g., using providing unit 1616) second audio control data to the audio output unit, wherein the second audio control data is distinct from the first audio control data, and wherein the second audio control data is associated with a second audio function.

In some embodiments, the contact does not activate a mechanically-actuated input.

In some embodiments, the processing unit is further configured to, prior to detecting the contact, detect (e.g., using detecting unit 1614) a user input; and enter (e.g., using mode entering unit 1618) the audio control mode in response to detecting the user input.

In some embodiments, the first audio control data is associated with changing a volume at which audio content is played.

In some embodiments, the first audio control data is associated with changing the audio content being played.

In some embodiments, the contact includes a movement of the contact, and the processing unit is further configured to: determine (e.g., using determining unit 1620) a direction of the movement of the contact relative to the rotatable input mechanism, wherein the first audio control data is based on the determined direction of the movement.

In some embodiments, the processing unit is further configured to: in accordance with a determination that the movement is in a first direction relative to the rotatable input mechanism, provide (e.g., using providing unit 1616), to the audio output unit, first audio control data that is associated with decreasing a volume at which audio content is being played; and in accordance with a determination that the movement is in a second direction different from the first direction, provide (e.g., using providing unit 1616), to the audio output unit, first audio control data that is associated with decreasing a volume at which audio content is being played.

In some embodiments, the processing unit is further configured to: in accordance with a determination that the movement is in a third direction relative to the rotatable input mechanism, provide (e.g., using providing unit 1616), to the audio output unit, first audio control data that is associated with switching the audio content being played from a first track to a second track; and in accordance with a determination that the movement is in a fourth direction different from the third direction, provide (e.g., using providing unit 1616), to the audio output unit, first audio control data that is associated with switching the audio content being played from the first track to a third track.

In some embodiments, the contact is a tap, and the first audio control data is based on the location of the tap relative to the rotatable input mechanism.

In some embodiments, in response to the tap being detected at a first location relative to the rotatable input mechanism, the audio control data is associated with decreasing a volume at which the audio content is played; and in response to the tap being detected at a second location relative to the rotatable input mechanism, the second location different from the first location, the audio control data is associated with increasing a volume at which the audio content is played.

In some embodiments, in response to the tap being detected at a third location relative to the rotatable input mechanism, the audio control data is associated with switching the audio content being played from a first track to a second track; and in response to the tap being detected at a fourth location relative to the rotatable input mechanism, the fourth location different from the third location, the audio control data is associated with switching the audio content being played from the first track to a third track.

In some embodiments, the processing unit is further configured to: detect (e.g., with detecting unit 1614) a second contact on the touch-sensitive display unit; and in response to detecting the second contact, activating the display unit.

In some embodiments, the processing unit is further configured to: while in the audio control mode, detect (e.g., using detecting unit 1614) a user input corresponding to a rotation of the rotatable input mechanism unit; and in response to detecting the user input, provide (e.g., using providing unit 1616) audio control data associated with an audio function to the audio output communicator.

In some embodiments, the contact is detected at a location on the device that is off of the display unit.

The operations described above with reference to FIG. 11 are, optionally, implemented by components depicted in FIGS. 1A-1B or FIG. 16. For example, detecting operation 1102 and providing operation 1104 are, optionally, implemented by event sorter 170, event recognizer 180, and event handler 190. Event monitor 171 in event sorter 170 detects a contact at a location corresponding to the rotatable input mechanism 506, and event dispatcher module 174 delivers the event information to application 136-1. A respective event recognizer 180 of application 136-1 compares the event information to respective event definitions 186, and determines whether the contact corresponds to a predefined event or sub event, such as a request to provide audio control data. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a RF circuitry or a bus to provide audio control data. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
    a display;
    a rotatable input mechanism;
    one or more processors;
    memory; and
    one or more programs stored in memory, including instructions that, when executed by the one or more processors, cause the device to:
        display, on the display, a user interface including a plurality of items with a focus selector associated with a first group of one or more items of the plurality of items;
        detect a user input corresponding to a rotation of the rotatable input mechanism, wherein the user input includes exactly two contacts that touch the rotatable input mechanism, the two contacts including a first contact that does not touch any portion of the display and a second contact that does not touch any portion of the display;
        in response to detecting the rotation, scroll the plurality of items and associate the focus selector with a second group of one or more items in accordance with the rotation;
        determine whether the contacts continue to touch the rotatable input mechanism while the second group of one or more items is associated with the focus selector;

in accordance with a determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, execute a process on the second group of one or more items that was associated with the focus selector based on the rotation of the rotatable input mechanism by the first contact and the second contact; and in accordance with a determination that at least one of the first contact that touches the rotatable input mechanism and does not touch any portion of the display and the second contact that touches the rotatable input mechanism and does not touch any portion of the display continues to touch the rotatable input mechanism while the second group of one or more items is in focus, forgo executing the process on the second group of one or more items.

2. The electronic device of claim 1, the one or more programs further including instructions to:

in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, dismiss the items that are not in the second group of one or more items, wherein executing the process includes the dismissing of the items.

3. The electronic device of claim 1, the one or more programs further including instructions to:

in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, place the second group of one or more items in a text field, wherein executing the process includes the placing of the items in the text field.

4. The electronic device of claim 1, the one or more programs further including instructions to:

send the second group of one or more items in an electronic message to an external device, wherein executing the process includes sending the items.

5. The electronic device of claim 1, the one or more programs further including instructions to:

in accordance with the determination that at least one of the first contact that touches the rotatable input mechanism and does not touch any portion of the display and the second contact that touches the rotatable input mechanism and does not touch any portion of the display continues to touch the rotatable input mechanism while the second group of one or more items is associated with the focus selector and while continuing to detect the user input corresponding to rotation of the rotatable input mechanism:

scroll the items to display items that were not previously visible on the display, and associate the focus selector with a third group of one or more items in accordance with the rotation.

6. The electronic device of claim 1, wherein the rotatable input mechanism is a crown.

7. The electronic device of claim 1, wherein the rotatable input mechanism is connected to a housing of the electronic device, and wherein the housing includes a plurality of contact sensors.

8. A non-transitory computer-readable storage medium comprising one or more programs for execution by one or more processors of an electronic device with a display and a rotatable input mechanism, the one or more programs including instructions which, when executed by the one or more processors, cause the electronic device to:

display, on the display, a user interface including a plurality of items with a focus selector associated with a first group of one or more items of the plurality of items;

detect a user input corresponding to a rotation of the rotatable input mechanism, wherein the user input includes exactly two contacts that touch the rotatable input mechanism, the two contacts including a first contact that does not touch any portion of the display and a second contact that does not touch any portion of the display;

in response to detecting the rotation, scroll the plurality of items and associate the focus selector with a second group of one or more items in accordance with the rotation;

determine whether the contacts continue to touch the rotatable input mechanism while the second group of one or more items is associated with the focus selector;

in accordance with a determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, execute a process on the second group of one or more items that was associated with the focus selector based on the rotation of the rotatable input mechanism by the first contact and the second contact; and in accordance with a determination that at least one of the first contact that touches the rotatable input mechanism and does not touch any portion of the display and the second contact that touches the rotatable input mechanism and does not touch any portion of the display continues to touch the rotatable input mechanism while the second group of one or more items is in focus, forgo executing the process on the second group of one or more items.

9. The non-transitory computer-readable storage medium of claim 8, the one or more programs further including instructions to:

in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, dismiss the items that are not in the second group of one or more items, wherein executing the process includes the dismissing of the items.

10. The non-transitory computer-readable storage medium of claim 8, the one or more programs further including instructions to:

in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, place the second group of one or more items in a text field, wherein executing the process includes the placing of the items in the text field.

11. The non-transitory computer-readable storage medium of claim 8, the one or more programs further including instructions to:
send the second group of one or more items in an electronic message to an external device, wherein executing the process includes sending the items.

12. The non-transitory computer-readable storage medium of claim 8, the one or more programs further including instructions to:
in accordance with the determination that at least one of the first contact that touches the rotatable input mechanism and does not touch any portion of the display and the second contact that touches the rotatable input mechanism and does not touch any portion of the display continues to touch the rotatable input mechanism while the second group of one or more items is associated with the focus selector and while continuing to detect the user input corresponding to rotation of the rotatable input mechanism:
scroll the items to display items that were not previously visible on the display, and
associate the focus selector with a third group of one or more items in accordance with the rotation.

13. The non-transitory computer-readable storage medium of claim 8, wherein the rotatable input mechanism is a crown.

14. The non-transitory computer-readable storage medium of claim 8, wherein the rotatable input mechanism is connected to a housing of the electronic device, and wherein the housing includes a plurality of contact sensors.

15. A method, comprising:
at a device with a display and a rotatable input mechanism:
displaying, on the display, a user interface including a plurality of items with a focus selector associated with a first group of one or more items of the plurality of items;
detecting a user input corresponding to a rotation of the rotatable input mechanism, wherein the user input includes exactly two contacts that touch the rotatable input mechanism, the two contacts including a first contact that does not touch any portion of the display and a second contact that does not touch any portion of the display;
in response to detecting the rotation, scrolling the plurality of items and associate the focus selector with a second group of one or more items in accordance with the rotation;
determining whether the contacts continue to touch the rotatable input mechanism while the second group of one or more items is associated with the focus selector;
in accordance with a determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, executing a process on the second group of one or more items that was associated with the focus selector based on the rotation of the rotatable input mechanism by the first contact and the second contact; and
in accordance with a determination that at least one of the first contact that touches the rotatable input mechanism and does not touch any portion of the display and the second contact that touches the rotatable input mechanism and does not touch any portion of the display continues to touch the rotatable input mechanism while the second group of one or more items is in focus, forgoing executing the process on the second group of one or more items.

16. The method of claim 15, further comprising:
in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, dismiss the items that are not in the second group of one or more items, wherein executing the process includes the dismissing of the items.

17. The method of claim 15, further comprising:
in accordance with the determination that both of the first contact that touches the rotatable input mechanism and does not touch any portion of the display and the second contact that touches the rotatable input mechanism and does not touch any portion of the display are no longer touching the rotatable input mechanism while the second group of one or more items is associated with the focus selector, place the second group of one or more items in a text field, wherein executing the process includes the placing of the items in the text field.

18. The method of claim 15, further comprising:
sending the second group of one or more items in an electronic message to an external device, wherein executing the process includes sending the items.

19. The method of claim 15, further comprising:
in accordance with the determination that at least one of the first contact that touches the rotatable input mechanism and does not touch any portion of the display and the second contact that touches the rotatable input mechanism and does not touch any portion of the display continues to touch the rotatable input mechanism while the second group of one or more items is associated with the focus selector and while continuing to detect the user input corresponding to rotation of the rotatable input mechanism:
scrolling the items to display items that were not previously visible on the display, and
associating the focus selector with a third group of one or more items in accordance with the rotation.

20. The method of claim 15, wherein the rotatable input mechanism is a crown.

21. The method of claim 15, wherein the rotatable input mechanism is connected to a housing of the electronic device, and wherein the housing includes a plurality of contact sensors.

* * * * *